(12) United States Patent
Galeev et al.

(10) Patent No.: US 12,166,682 B2
(45) Date of Patent: Dec. 10, 2024

(54) METHODS AND APPARATUS TO FACILITATE DATA TRANSMISSION

(71) Applicant: Intel Corporation, Santa Clara, CA (US)

(72) Inventors: Mikhail Galeev, Beaverton, OR (US); Susruth Sudhakaran, Beaverton, OR (US); Dave Cavalcanti, Portland, OR (US); Amit Baxi, Maharashtra (IN); Vincent S. Mageshkumar, Maharashtra (IN)

(73) Assignee: Intel Corporation

( * ) Notice: Subject to any disclaimer, the term of this patent is extended or adjusted under 35 U.S.C. 154(b) by 840 days.

(21) Appl. No.: 17/132,845

(22) Filed: Dec. 23, 2020

(65) Prior Publication Data
US 2021/0218686 A1 Jul. 15, 2021

(51) Int. Cl.
| | | |
|---|---|---|
| *H04L 47/27* | (2022.01) | |
| *H04L 43/022* | (2022.01) | |
| *H04L 47/10* | (2022.01) | |
| *H04L 47/2425* | (2022.01) | |
| *H04L 47/28* | (2022.01) | |

(52) U.S. Cl.
CPC ............ *H04L 47/27* (2013.01); *H04L 43/022* (2013.01); *H04L 47/16* (2013.01); *H04L 47/2425* (2013.01); *H04L 47/28* (2013.01)

(58) Field of Classification Search
CPC ....... H04L 47/27; H04L 43/022; H04L 47/00; H04L 47/16; H04L 47/2425; H04L 47/28; H04L 43/08; H04L 43/50; H04L 43/0852; H04L 1/1657; H04L 1/1607; H04L 5/0055
See application file for complete search history.

(56) References Cited

U.S. PATENT DOCUMENTS

| | | | |
|---|---|---|---|
| 7,020,083 B2* | 3/2006 | Garcia-Luna-Aceves | .................. H04W 28/0273 370/235 |
| 11,770,816 B2* | 9/2023 | Bush | .................. B61L 15/0027 370/330 |
| 2019/0045475 A1* | 2/2019 | Kasichainula | ..... G05B 19/0423 |
| 2019/0116241 A1* | 4/2019 | Bonomi | .................. H04L 67/62 |
| 2020/0249874 A1* | 8/2020 | Foo | ........................ G06F 16/182 |
| 2022/0225253 A1* | 7/2022 | Galeev | ................... H04L 1/0026 |
| 2023/0291692 A1* | 9/2023 | Bonneville | ............. H04L 47/83 |

OTHER PUBLICATIONS

IEEE Computer Society, "IEEE Std 802.11k™—2008 (Amendment to IEEE Std 802.11™—2007)," New York, NY, Jun. 12, 2008, 244 pages.

(Continued)

*Primary Examiner* — Mohamed A Kamara
(74) *Attorney, Agent, or Firm* — HANLEY, FLIGHT & ZIMMERMAN, LLC

(57) ABSTRACT

Methods, apparatus, systems, and articles of manufacture to facilitate data transmission are disclosed. An examples apparatus includes a schedule controller to determine a first time corresponding to an end of a window for a data exchange; a data packet controller to determine a second time corresponding to an acknowledgement send during the window; a link performance calculator to calculate link performance based on the first time and the second time; and an interface to transmit the link performance to a network configuration entity.

25 Claims, 17 Drawing Sheets

(56) References Cited

OTHER PUBLICATIONS

IEEE Computer Society, IEEE Std 802.11v™—2011 (Amendment to IEEE Std 802.11™—2007 as amended by IEEE Std 802.11k™—2008, IEEE Std 802.11r™—2008, IEEE Std 802.11y™—2008, IEEE Std 802.11w™—2009, IEEE Std 802.11n™—2009, IEEE Std 802.11p™—2010, and IEEE Std 802.11z™—2010), New York, NY, Feb. 9, 2011, 433 pages.

Gardiner, "Theory of Operation for TSN-enabled Systems," Avnu Alliance Best Practices, Feb. 28, 2017, 71 pages.

IEEE Computer Society, "IEEE Std 802.1Qbv™—2015 (Amendment to IEEE Std 802.1Q™—2014 as amended by IEEE Std 802.1Qca™—2015, IEEE Std 802.1Qcd™—2015, and IEEE Std 802.1Q-2014/Cor 1-2015)," New York, NY, published Mar. 18, 2016, 57 pages.

* cited by examiner

Table 1100:

| RANDOMIZATION INTERVAL | MEASUREMENT DURATION | PEER STA ADDRESS | TRAFFIC IDENTIFIER | BIN 0 RANGE | OPTIONAL SUBLEMENTS |
|---|---|---|---|---|---|

OCTETS: 2, 2, 6, 1, 1, VARIABLE

1102 → 1104:

| TRIGGER CONDITIONS | AVERAGE ERROR THRESHOLD | CONSECUTIVE ERROR THRESHOLD | DELAY THRESHOLD | MEASUREMENT COUNT | TRIGGER TIME-OUT |
|---|---|---|---|---|---|

OCTETS: 1, 1, 1, 1, 1, 1

1118:

| NAME | MEASUREMENT TYPE | MEASUREMENT USE |
|---|---|---|
| BASIC REPORT | 0 | SPECTRUM MANAGEMENT |
| CCA REPORT | 1 | |
| RPI HISTOGRAM REPORT | 2 | |
| CHANNEL LOAD REPORT | 3 | RADIO RESOURCE MEASUREMENT |
| NOISE HISTOGRAM REPORT | 4 | |
| BEACON REPORT | 5 | |
| FRAME REPORT | 6 | |
| STA STATISTICS REPORT | 7 | |
| LCI REPORT | 8 | |
| TRANSMIT STREAM/ CATEGORY MEASUREMENT REPORT | 9 | |
| TIME SENSITIVE SCHEDULING | 10-255 | N/A |

| ACTUAL MEASUREMENT START TIME | MEASUREMENT DURATION | PEER STA ADDRESS | TRAFFIC IDENTIFIER | REPORTING REASON | MSDU COUNT |
|---|---|---|---|---|---|
| 8 | 2 | 6 | 1 | 1 | 4 |

OCTETS

← 1124

← 1126

| MSDU DISCARDED COUNT | MSDU FAILED COUNT | MSDU MULTIPLE RETRY COUNT | QOS CF-POLLS LOST COUNT | AVERAGE QUEUE DELAY | AVERAGE TBUF VALUE |
|---|---|---|---|---|---|
| 4 | 4 | 4 | 4 | 4 | 4 |

OCTETS

| BIN 0 RATING | BIN 0 | BIN 1 | BIN 2 | BIN 3 | BIN 4 | BIN 5 | OPTIONAL SUBLEMENTS |
|---|---|---|---|---|---|---|---|
| 1 | 4 | 4 | 4 | 4 | 4 | 4 | VARIABLE |

OCTETS

← 1126

← 1128

| B0 | B1 | B2 | B3 | | B7 |
|---|---|---|---|---|---|
| AVERAGE TRIGGER | CONSECUTIVE TRIGGER | DELAY TRIGGER | RX TBUF | RESERVED | |
| 1 | 1 | 1 | 1 | 4 | |

BITS

← 1130

| NAME | EVENT TYPE |
|---|---|
| TRANSITION | 0 |
| RSNA | 1 |
| PEER-TO-PEER LINK | 2 |
| WNM LOG | 3 |
| TSS EVENT | 4 |
| RESERVED | 5-220 |
| VENDOR SPECIFIC | 221 |
| RESERVED | 222-225 |

METHODS AND APPARATUS TO FACILITATE DATA TRANSMISSION

BACKGROUND

Time-sensitive networking (TSN) is a set of protocols developed by a working group of the Institute of Electrical and Electronics Engineers (IEEE) 802.1, 802.1Qcc, etc. The TSN may be implemented in a network of devices (e.g., end-devices, stations (STAs), access points (APs), bridges, servers, etc.) to be able to exchange data between the devices. For example, the TSN protocol may be used in conjunction with edge networks, wireless networks (e.g., Wi-Fi, fifth generation (5G) cellular networks, etc.), and/or wired networks (e.g., Ethernet). TSN protocols may be used for any type of device-to-device communication including real-time gaming, industrial control systems, etc.

BRIEF DESCRIPTION OF THE DRAWINGS

FIGS. 11A and 11B illustrate example data packets and/or element type definitions that may utilized in conjunction with determining link performance.

Figure 1:
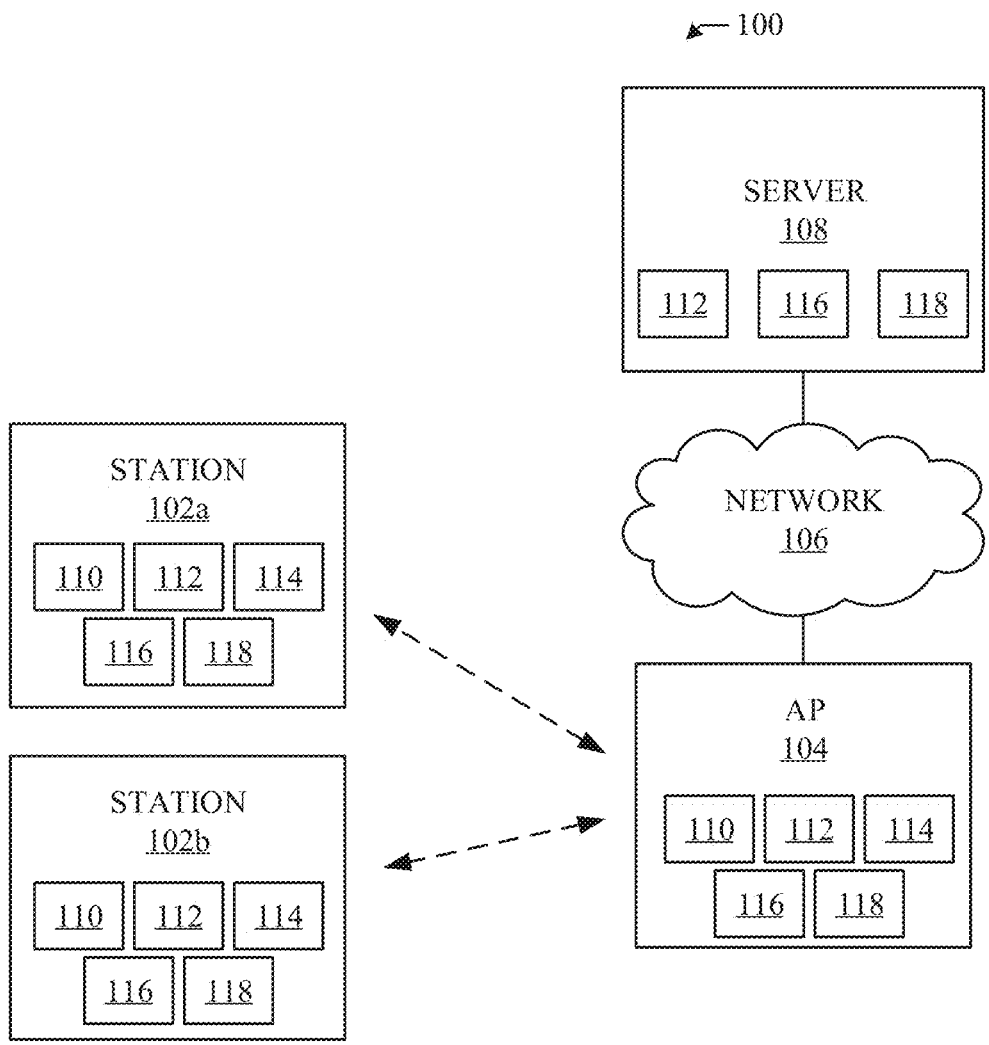
FIG. 1 is an example time-sensitive network environment to facilitate data transmission.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As described above, TSN may be implemented in a network of devices (e.g., end-devices, stations, access points, bridges, servers, etc.) to be able to exchange data between the devices. In a centralized TSN management model (e.g., corresponding to 802.11Qcc), communications in the TSN domain (e.g., either wired or wireless) are scheduled with a high degree of reliability. TSN end devices (e.g., stations, talkers, listeners, etc.) as well as network elements (e.g., bridges, access points (APs), client devices, etc.) operate according to a global time-aware schedule device by a central network configuration (CNC) entity. A global time-aware schedule (also referred to as global schedule) is a schedule that is known by all devices operating in a network prior to implementation of the schedule.

Each device of the network exchanges data according to the global time-aware schedule. For example, if a first station (e.g., a transmitting device, a talker, etc.) is scheduled to exchange data to a second station (e.g., a receiving device, a listener, etc.) via a link during a particular protected window. The first station transmits a TSN data frame to the second station when the particular protected window occurs. In response to obtaining the TSN data frame, the second station transmits an acknowledgement (ACK) to the first device. In some examples, if the first station does not obtain the ACK within a threshold amount of time, the first station will repeat transmission of the TSN data frame until the ACK is received or the protected window ends. The length of the protected window is a preset amount of time corresponding to a worst case scenario based on prior observation and/or statistical analysis. The preset amount of time ensures, within some percentage of assurance, that the TSN data frame will be obtained by the listener and the ACK within the protected window.

Traditional network elements and devices do not have a mechanism to measure wireless link performance specific to TSN requirements (e.g., with respect to time-aware schedule operation). Accordingly, the global time-aware schedule includes the protected window with a length long enough to ensure (e.g., with some percentage of assurance) successful data exchange even with poor channel conditions that may require higher redundancy and/or time for retransmissions. However, such a large, protected window duration is inefficient for good channel conditions with less redundancy or time retransmissions. Further, there is not mechanism in traditional network elements to highlight when the protected window duration is not long enough and/or if/when any other issue occurs in the TSN network.

Examples disclosed herein monitor link performance to highlight irregularities and errors and/or dynamically adjust a global schedule (e.g., by increasing or decreasing the length of the protected windows) to account for the dynamic wireless link conditions in a network. Examples disclosed herein include performing link performance measurements at the talking device (e.g., device transmission data) and the listening device and transmitting the measurements to a CNC. The link performance measurement at the talking device is herein referred to as a transmitting (Tx) time buffer (TxTBuf) and the link performance measurement at the listening device is herein referred to as a receiving (Rx) time buffer (RxTBuf). The talking station calculates the TxTBuf by determining the difference between a time of the end of the protected window (TX_Twe) and a time of when the ACK was obtained (Tx_Tdone) (e.g., TxTBuf=TX_Twe−Tx_Tdone [in microseconds]). The listening station calculates the RxTBuf by determining the difference between a time of the end of the protected window (RX_Rwe) and a time of when the ACK was sent (R_Tdone) (e.g., RxTBuf=RX_Rwe−Rx_Tdone [in microseconds]). If there is no transmission error, the TxTBuf and the RxTBuf should be similar (e.g., within a threshold amount of time). However, if there is a transmission error or the protected window is not long enough, the TxTBuf may be significantly different than the RxTBuf, the TxTBuf may be 0 or negative, and/or the RxTBuf may be negative). Using examples disclosed herein the CNC can process the link performance measurements to generate a report, mitigate transmission errors, and/or adjust the protected window duration to make the network more efficient or to increase performance. Although examples disclosed herein are described in conjunction with the IEEE standard 802.11Qbv, examples disclosed herein may be described in conjunction with any standard that corresponds to a global time-aware schedule (e.g., 802.11, 802.1, etc.)

In some examples, real-time application middleware services are used to abstract underlaying communication infrastructure from application development by providing clear interfaces to specific services. For example, data distribute service (DDS) is an example of a communication middleware specification standardization that provides scalable deterministic real-time data transport for real-time mission critical applications spanning multiple industries (e.g., automotive, robotics, medical, avionics, etc.). DDS defines QoS contracts and/or guarantees that applications can leverage to obtain real-time deterministic delivery of data.

Although traditional services provide interfaces for data delivery, QoS guarantees, and/or data transport at the application layer, the traditional services cannot ensure the QoS guarantees are satisfied because such traditional services have no control over the underlying network resources that are required to deliver the expected QoS guarantees. Accordingly, QoS guarantees at the application layer may be ignored at the network layer.

Examples disclosed herein include mapping data exchange in the DDS domain (e.g., DDS layer) to delivery in the TSN domain (e.g., TSN layer). For example, examples disclosed herein map a DDS topic (e.g., fundamental means of application interaction between devices in the DDS domain) to a time critical TSN traffic stream of the TSN domain. Examples disclosed herein associates the DDS topic to the TSN stream configuration parameters to ensure that QoS guarantees are met. Examples disclosed herein further provide a TSN Configuration Service (TCS) that interprets the mapping and configures the TSN network to ensure that the QoS guarantees are met by negotiating with TSN layer components to set up a data stream that satisfies the QoS guarantees. Although examples disclosed herein are described in conjunction with TSN services, examples disclosed herein can be used in conjunction with any services that include middleware (e.g., Object Linking and Embedding for Process Control Unified Architecture (OPC-UA))

FIG. 1 is an example TSN environment 100 to facilitate data transmission. The example TSN environment 100 includes example stations 102a-102b, an example access point 104, an example network 106, an example server 108, an example data collector 110, an example central network configuration entity (CNC) 112, an example DDS layer 114, an example TCS layer 116, and an example centralized user configuration entity (CUC) 118. Although the example environment 100 is a TSN environment, the example environment 100 may correspond to any environment that utilizes a global time-aware schedule or any environment that includes middleware. Additionally, although the example environment 100 includes two stations 102a, 102b, the AP 104, and the server 108, the environment 100 may include any number of stations connected to any number of APs, bridges, servers, etc. via the network 106.

The example STAs 102a, 102b of FIG. 1 are TSN and/or Wi-Fi enabled computing devices. The example STAs 102a, 102b may be, for example, computing devices, portable devices, mobile devices, mobile telephones, smart phones, tablets, gaming systems, televisions, sensors, internet of things (IoT) devices or sensors, edge devices, robotic equipment, automotive computers, medical equipment, avionic equipment, and/or any other TSN and/or Wi-Fi enabled device. The example STAs 102a, 102b include the example radio architecture (e.g., to transmit and/or receive data) and/or other processors (e.g., implementing one or more applications). The example STAs 102a, 102b may include all or part of the example data collector 110, the example CNC 112, the example DDS layer 114, the example TCS layer 116, and/or the example CUC 118, as further described below. In examples disclosed herein, the example STA 102a corresponds to a publisher and/or talker and the example STA 102b corresponds to a subscriber and/or listener. However, either device 102a can be implemented as either a publisher/talker and/or a subscriber/listener.

The example AP 104 of FIG. 1 is a device that allows the example STAs 102a, 102b to access the example network 106 and/or to connect to each other. The example AP 104 may be a router, a modem-router, a bridge, and/or any other device that provides a connection to a network. A router provides a wireless communication link to a STA. The router accesses the network through a wire connection via a modem. A modem-router combines the functionalities of the modem and the router. The example AP 104 may include all or part of the example data collector 110, the example CNC 112, the example DDS layer 114, the example TCS layer 116, and/or the example CUC 118, additional processors (e.g., implementing software), and/or radio architecture (e.g., to transmit and/or receive data).

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example AP 104 and/or the server 108 includes a communication interface that enables a connection to an Ethernet, a digital subscriber line (DSL), a telephone line, a coaxial cable, or any wireless connection, etc.

The example server 108 of FIG. 1 is a computing device that may implement all or part of the example CNC 112, the example TCS layer 116, and/or the example CUC 118 to monitor link performance, ensure QoS guarantees from the DDS layer to the network layer, and/or to negotiate data streams with the example TCS layer 116, as further described below.

The example data collector 110 of FIG. 1 is a component that may be implemented in a device that performs a data exchange during a window identified in a global time-aware schedule. The example data collector 110 collects link performance information (e.g., data, metrics, etc.) based on a time corresponding to the end of the window and an acknowledgement. For example, when the data collector 110 is implemented in a transmitting device (e.g., a forwarding bridge, the AP 104 and/or the talking STA 102*a*), the data collector 110 determines a TxTBuf based on the time when an ACK is received (e.g., TxTBuf=TX_Twe−Tx_Tdone [in microseconds]). When the data collector is implemented in a receiving device (e.g., a forwarding bridge, the AP 104, and/or the listening STA 102*b*), the data collector 110 determines a RxTBuf based on the time when the ACK is sent (e.g., RxTBuf=RX_Rwe−Rx_Tdone [in microseconds]). Additionally, the example data collector 110 may flag transmission errors when the ACK is not transmitted and/or received within a protected window. The example data collector 110 transmits the determined link performance information to the example CNC 112. The example data collector 110 may transmit the determined link performance information after every data exchange, after one or more preset numbers of data exchanges, and/or based on a trigger (e.g., when an error has been identified, the CNC 112 requests the link performance information, etc.). If the data collector 110 only transmits link performance information based on a trigger, the data collector 110 may sent multiple previous link performance measurements when an error occurs, or may send only the link performance information corresponding to the error. If the data collector 110 sends only the link performance information corresponding to the error, the data collector 110 may include other contextual information (e.g., an indication of the number of successful data exchanges prior to the error). The example data collector 110 is further described below in conjunction with FIG. 2A.

The example CNC 112 of FIG. 1 processes obtained link performance metrics from talker devices (e.g., STA 102*a*) and listener devices (STA 102*b*). The example CNC 112 may process the link performance metrics to identify a Rx time buffer and a Tx time buffer that correspond to the same link (e.g., the same window where an attempt to exchange data between the STA 102*a* and the STA 102*b*). In this manner, the CNC 112 can identify an error or an irregularity if, for example, the Rx time buffer value is not within a threshold range of the Tx time buffer value (e.g., corresponding to a retransmission and/or a delay in the transmission of the data and/or the ACK). Additionally, the CNC 112 may process the link performance metrics to identify any other irregularity (e.g., when the Tx time buffer or the Rx time buffer is negative or the link performance metrics include, or otherwise identify, an error). In some examples, the CNC 112 generates a jitter measurement based on the obtained link performance metrics. For example, the CNC 112 may generate a histogram of the obtained Tx time buffer and/or Rx time buffer information. The example CNC 112 may generate a report based on the processed link performance metrics (e.g., including identified errors, irregularities, and/or the jitter histogram). The CNC 112 may output the report to a user interface and/or may be used for further statistical analysis at a later point in time. In some examples, the CNC 112 may mitigate errors based on the report, the identified errors, and/or the identified irregularities. For example, the CNC 112 may adjust the schedule to increase the duration of the protected window when a threshold number of errors or irregularities have been identified (e.g., to increase performance and/or reduce errors). Additionally, the CNC 112 may adjust the schedule to decrease the duration of the protected window based on the histogram and/or when an error or irregularity has not occurred within a threshold amount of time or a threshold number of data exchanges (e.g., to increase efficiency and/or amount of data exchanges). The CNC 112 may be implemented in a single device (e.g., the STA 102*a*, 102*b*, the AP 104, or the server 108) or may be part of a distributed system where parts of the CNC 112 are implemented at different devices. The example CNC 112 is further described below in conjunction with FIG. 2B.

The example DDS layer 114 of FIG. 1 is a communication middleware service that publishes and/or subscribes to data using topics. A topic is a unit of information about a single data type and/or the distribution and availability of the samples. The topic may be defined by name, type, and a set of QoS policies. The DDS layer 114 transfers data values (e.g., samples) through a network to device that subscribe to an advertised publication. The DDS layer 114 includes a data writer to publish of data and/or a data reader to subscribe to the data. At the publisher side, the example DDS layer 114 overloads the QoS Policy data structure to include topic data that includes a time sensitive network profile (TSN profile). The TSN profile (also referred to as a TSN traffic profile) may include a maximum data unit size (e.g., a maximum size of data packets), an inter packet arrival time (e.g., a minimum media access controller service data unit (MSDU) interarrival time if the data published is periodic or a minimum interval between data events if the data is non-periodic), a latency bound (e.g., a minimum latency tolerated), a proxy demand resource (PDR) or other reliability value (e.g., an expected packet delivery ratio within the latency bound), and/or a jitter value (e.g., a minimum jitter in latency tolerated). The DDS layer 114 transmits the overloaded QoS Policy (also referred to as the QoS policy data structure) to the example TCS layer 116. In response to transmitting the overloaded QoS Policy, the data writer of the DDS layer 114 obtains a TSN data driver to data writer mapping, as further described below. The data writer of the DDS layer 114 uses the mapping to transmit a topic the TSN data driver of the mapping to ensure that the topic is transmitted according to the QoS guarantees. The DDS layer 114 may be implemented in a single device (e.g., the STA 102a, 102b, the AP 104, or the server 108) or may be part of a distributed system where parts of the DDS layer 114 are implemented at different devices. The example DDS layer 114 is further described below in conjunction with FIG. 4A.

The example TCS layer 116 of FIG. 1 maps the topics of the DSS layer 114 to a data stream based on QoS streams identified at the DDS layer 114. The example TCS layer 116 extracts and stores a TSN profile from a QoS policy sent from the data writer of the DDS layer 114. In this manner, when a subscriber subscribes to a topic corresponding to the data writer, the TCS layer 116 can negotiate with the CNC 112 and/or the CUC 118 to set up a data stream that satisfies the QoS guarantees included in the TSN profile. After a subscriber subscribes to a publisher and a data stream that satisfies the QoS guarantees is established, topics at the DDS layer 114 will be transmitted to the data writer of the TCS layer 116, so that the data writer of the TCS layer 116 can transmit the topic via the established stream to a data reader in the TCS layer 116. The data reader in the TCS layer 116 transmits the topic to the data reader in the DDS layer 114. The TCS layer 116 may be implemented in a single device (e.g., the STA 102a, 102b, the AP 104, or the server 108) or may be part of a distributed system where parts of the TCS layer 116 are implemented at different devices. The example TCS layer 116 is further described below in conjunction with FIG. 4B.

Figure 2A:
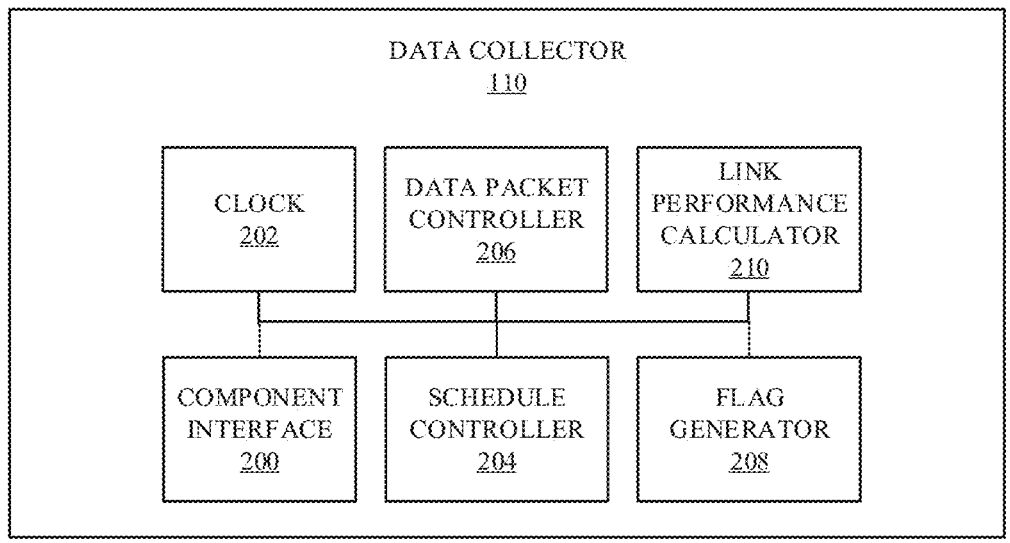
FIG. 2A is a block diagram of an implementation of the example data collector of FIG. 1.

FIG. 2A is a block diagram of an example implementation of the data collector 110 of FIG. 1. The example data collector 110 includes an example component interface 200, an example clock 202, an example schedule controller 204, an example data packet controller 206, an example flag generator 208, and an example link performance calculator 210.

The example component interface 200 of FIG. 2A interfaces with other components of the device that is implementing the data collector 110. For example, the device implementing the data collector 110 may include radio architecture to transmit and/or receive data packets. Accordingly, the example component interface 200 can obtain data packets received using the radio architecture and/or instruct (e.g., cause) the radio architecture to send data packets.

The example clock 202 of FIG. 2A keeps track of time. The monitored time may be used to determine (a) when a protected window occurs, (b) when an ACK is received, and/or (c) when a ACK is sent. As described above, the time when the ACK is received and/or sent is used to determine the RxTBuf value and/or the TxTBuf value.

The example schedule controller 204 of FIG. 2A monitors the time of the clock 202 to determine when a protected window for data exchange occurs based on a global time-aware schedule. For example, the schedule controller 204 processes the global time-aware schedule to determine which protected windows correspond to a data exchange and when the protected windows occur. The example schedule controller 204 also identifies the end of the protected windows based on the previously obtained global schedule. In some examples, the schedule controller 204 includes circuitry to access the timing information from the example clock 202 and/or access data corresponding to the global schedule (e.g., from memory or a storage device). In some examples, the schedule controller 204 is code to access the timing information from the example clock 202 and/or access data corresponding to the global schedule (e.g., from memory or a storage device).

The example data packet controller 206 of FIG. 2A generates data packets. For example, the data packet controller 206 may, when implemented as a talker, generate a TSN data frame and instruct the component interface 200 to transmit the TSN data frame via the radio architecture during a protected window. Additionally, the data packet controller 206 may, when implemented as a listener, generate an ACK when a TSN data frame is received. The data packet controller 206 may also record the time when the ASK was received or sent. In some examples, the data packet controller 206 includes circuitry to (a) generate and/or organize data into a data packet and/or ACK and/or (b) to transmit and/or store generated data based on instructions from another component. In some examples, the data packet controller 206 is code to (a) generate and/or organize data into a data packet and/or ACK and/or (b) to transmit and/or store generated data based on instructions from another component.

The example flag generator 208 of FIG. 2A generates flags corresponding to data exchange errors. For example, the flag generator 208 may generate a flag when the ACK and/or the TSN data frame is not obtained within the protected window. The flag may be provided to the example CNC 112 to generate a report, mitigate issues, and/or increase efficiency by adjusting the global schedule. In some examples, the flag generator 208 circuitry to flag errors. In some examples, the flag generator 208 is code to flag errors.

The example link performance calculator 210 of FIG. 2A calculates the Tx time buffer and/or the Rx time buffer. As described above, the Tx time buffer and Rx time buffer is representative of link performance. The link performance calculator 210 may include a subtractor to calculate the Tx time buffer by determining a difference between a time of the end of the protected window (TX_Twe) and a time of when the ACK was obtained (Tx_Tdone) (e.g., TxTBuf=TX_Twe−Tx_Tdone [in microseconds]). The example link performance calculator 210 calculates the RxTBuf by determining the difference between a time of the end of the protected window (RX_Rwe) and a time of when the ACK was sent (R_Tdone) (e.g., RxTBuf=RX_Rwe−Rx_Tdone [in microseconds]). The example link performance calculator 210 instructs the component interface 200 to transmit the calculated time buffer to the CNC 112 using the radio architecture of the implementing device. In some examples, the link performance calculator 210 includes circuitry to calculate time buffers. In some examples, the link performance calculator 210 is code to calculate time buffers.

Figure 2B:
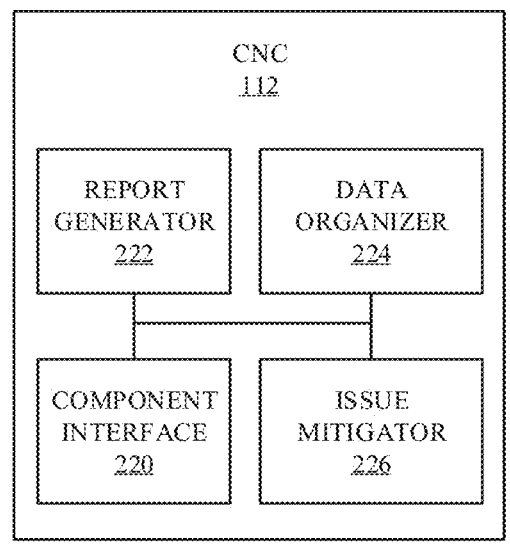
FIG. 2B is a block diagram of an implementation of the example central network configuration of FIG. 1.

FIG. 2B is a block diagram of an example implementation of the CNC 112 of FIG. 1. The example CNC 112 includes an example component interface 220, an example report generator 22, an example data organizer 224, and an example issue mitigator 226.

The example component interface 220 of FIG. 2B interfaces with other components of the device that is implementing the CNC 112. For example, the device implementing the CNC 112 may include radio architecture to transmit and/or receive data packets. Accordingly, the example component interface 220 can obtain data packets received using the radio architecture and/or instruct (e.g., cause) the radio architecture to send data packets.

The example report generator 222 of FIG. 2B generates a report based on obtained link performance information talking and listening devices (e.g., the example STA 102a, 102b, the example AP 104). The report generator 222 may include error(s) and/or irregularity(ies) in the report (e.g., corresponding to obtained errors, a difference between corresponding TxTBuf and RxTBuf being more than a threshold, either the TxTBuf or the RxTBuf being negative, etc.). Additionally, the report generator 222 may include a jitter measurement generated by the data organizer 224 in the report. In some examples, the report generator 222 includes circuitry to generate a report. In some examples, the report generator 222 is code to generate a report.

The example data organizer 224 of FIG. 2B computes a jitter measurement based on obtained link performance metrics (e.g., Tx time buffers and Rx time buffers). For example, the data organizer 224 may compute the jitter measurement as a histogram of the obtained link performance metrics. The jitter measurement includes the values of the link performance metrics to represent the link performance for a plurality of data exchanges. The example data organizer 224 transmits the generated jitter measurement to the example report generator 22 to include in the report. In some examples, the data organizer 224 includes circuitry to organize data. In some examples, the data organizer 224 is code to organize data.

The example issue mitigator 226 of FIG. 2 mitigates issues and/or adjust the global time-aware schedule based on the generated report. For example, if there is an error or irregularity, the example mitigator 226 may transmit commands to the corresponding devices to mitigate an issue based on the identified error or irregularity (e.g., by requiring the corresponding devices to include or increase redundancy and/or retransmission). In some examples, the example mitigator 226 adjusts the length of the protected window based on the jitter measurement and/or any errors and/or irregularities. For example, if there are no errors and/or irregularities and the jitter measurements identify that the smallest Tx time buffer is 1 millisecond, the issue mitigator 226 may decrease the length of the protected window by 1 millisecond. If there is one or more errors or irregularities, the issue mitigator 226 may increase the length of the protected window. In some examples, the issue mitigator 226 includes circuitry to mitigate issues. In some examples, the issue mitigator 226 is code to mitigate issues.

Figure 3A:
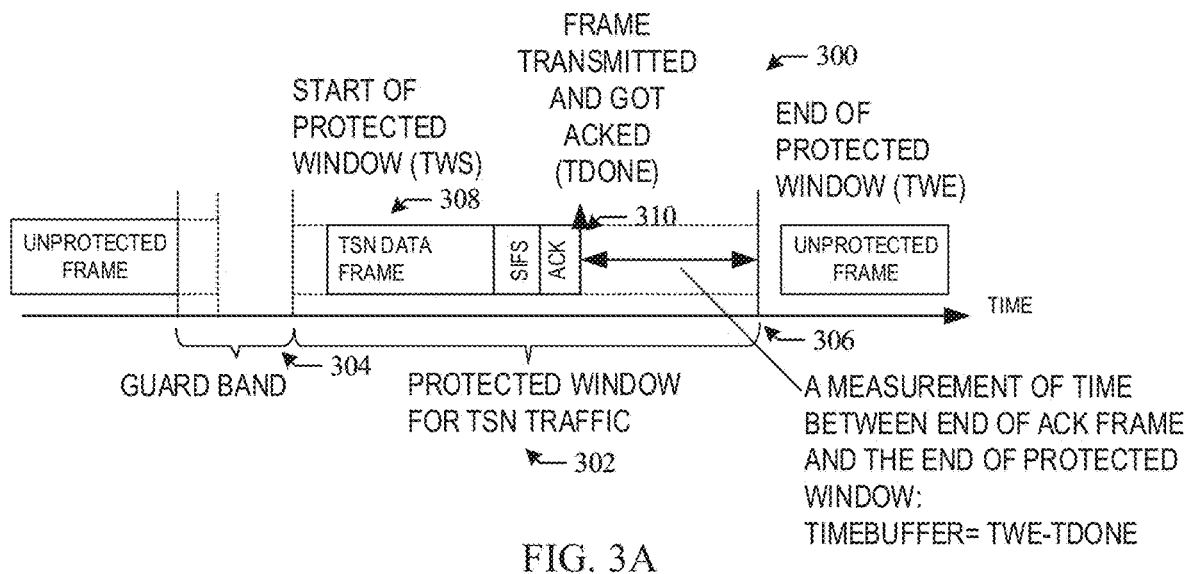
FIG. 3A is an example timing diagram that illustrates an example protected window for time sensitive network data exchange.

FIG. 3A is an example timing diagram 300 that illustrates an example protected window 302 for TSN data exchange between a first device (e.g., the example STA 102a) and a second device (the example STA 102b). The example timing diagram 300 includes the example protected window 302, an example protected window start time 304, an example protected window end time 306, an example TSN data frame 308, and an example ACK 310.

As described above, the devices in a TSN network have prior knowledge of the global schedule. Accordingly, shortly after the protected window start time 304, the data collector 110 of the example STA 102a transmits the TSN data frame 308 to the example STA 102b. After the STA 102b receives the TSN data frame 308, the data collector 110 of the example STA 102b transmits the example ACK 310. After transmitting the ACK 310, the example STA 102b calculates the Rx time buffer based on a difference between the end of the protected window 306 and the time when the ACK 310 was sent. After the example STA 102a receives the ACK 310, the data collector 110 of the example STA 102a calculates the Tx time buffer based on a difference between the end of the protected window 306 and the time when the ACK 310 was received.

Figure 3B:
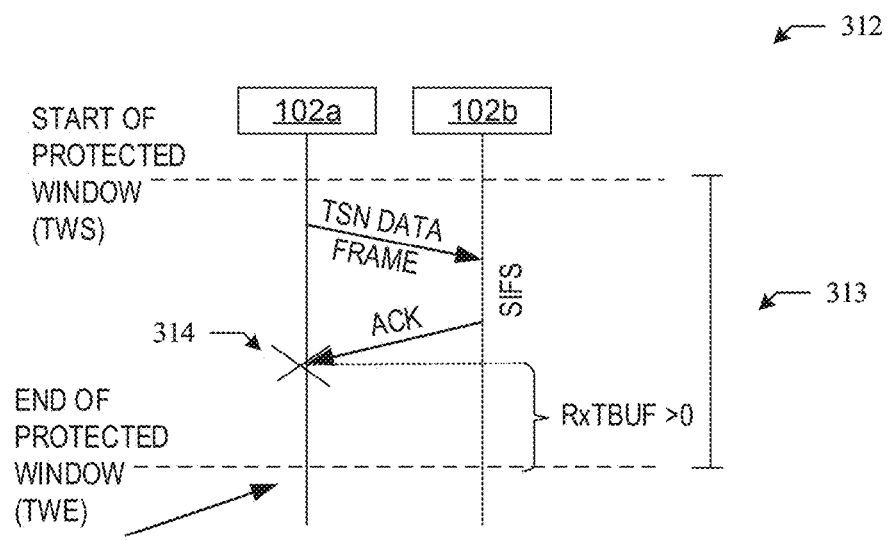
FIG. 3B is an alternative example timing diagram that illustrates an example protected window for a time sensitive network data exchange.

FIG. 3B is an example timing diagram 312 that illustrates an example protected window 313 for TSN data exchange between a first device (e.g., the example STA 102a) and a second device (the example STA 102b). The example timing diagram 312 includes a failed ACK 314.

As shown in the example timing diagram 312 of FIG. 3, the example STA 102a transmit a TSN data frame and the example STA 102b transmits an ACK in response to obtaining the data frame. However, the STA 102a never receives the ACK. In the illustrated example of FIG. 3, because the STA 102a does not retransmit the TSN data frame, the data collector 110 of the STA 102a will timeout the time corresponding to the time when the ACK was received, because the ACK was never received. In this manner, the Tx time buffer will end up being 0 or a negative number. The Rx time buffer will still be positive because the ACK was sent. If the STA 102a was able to retransmit the TSN data frame, it is possible that the STA 102a will obtain a ACK after the end of the protected frame, thereby resulting in a negative Tx time buffer. In such examples, the data collector 110 of the STA 102a may transmit the negative Tx time buffer with an indication that the ACK was received (or a lack of an indication that the ACK was not received).

Figure 4A:
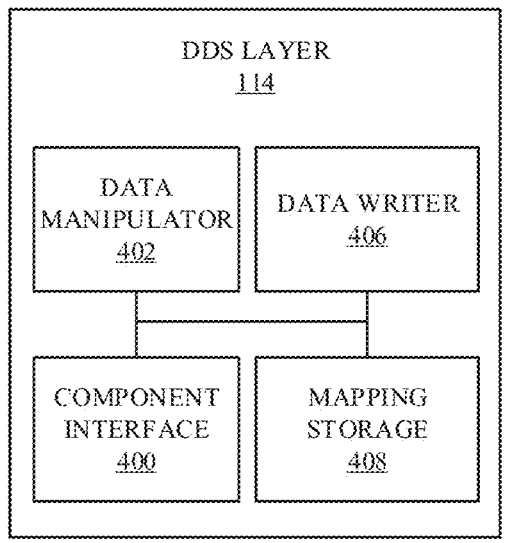
FIG. 4A is a block diagram of an implementation of the example data distributed service layer of FIG. 1.

FIG. 4A is a block diagram of an example implementation of the DDS layer 114 of FIG. 1. The example DDS layer 114 includes an example component interface 220, an example data manipulator 402, an example mapping storage 408, and an example data writer 406.

The example component interface 400 of FIG. 4A interfaces with other components of the device that is implementing the DDS layer 114. For example, the device implementing the DDS layer 114 may include radio architecture to transmit and/or receive data packets. Accordingly, the example component interface 400 can obtain data packets received using the radio architecture and/or instruct (e.g., cause) the radio architecture to send data packets. Additionally, the example component interface 400 can obtain data (e.g., a TSN profile), instructions, topics, etc. from an application.

The example data manipulator 402 overloads a specific DDS QoS policy data structure to include the TSN profile defining network-based QoS guarantees. The example data manipulator 402 instructs the component interface 400 to cause the radio architecture to transmit overloaded DDS QoS policy data structure to the example TCS layer 116. In this manner, the example TCS layer 116 can map a TSN data writer to the example data writer 406 of the DDS layer 114.

The example mapping storage 408 of FIG. 4A stores the TSN data writer to DDS data writer mapping. The TCS layer 116 transmits the TSN data writer to DDS data writer mapping after the mapping is generated. The component interface 400 obtains the mapping via the radio architecture of the implementing device and transmits the mapping to the mapping storage 408 to be stored therein.

The example data writer 406 of FIG. 4 transmits topics when a subscriber subscribes to the publishing device that implements the data writer 406. To ensure that QoS network guarantees are met, the data writer 406 access the stored mapping to identify the corresponding TSN data writer and transmits the topic to the identified TSN data writer. In this manner, the TSN data writer can transmit the topic via an established stream that satisfies the QoS guarantees via the TSN layer, as further described below.

Figure 4B:
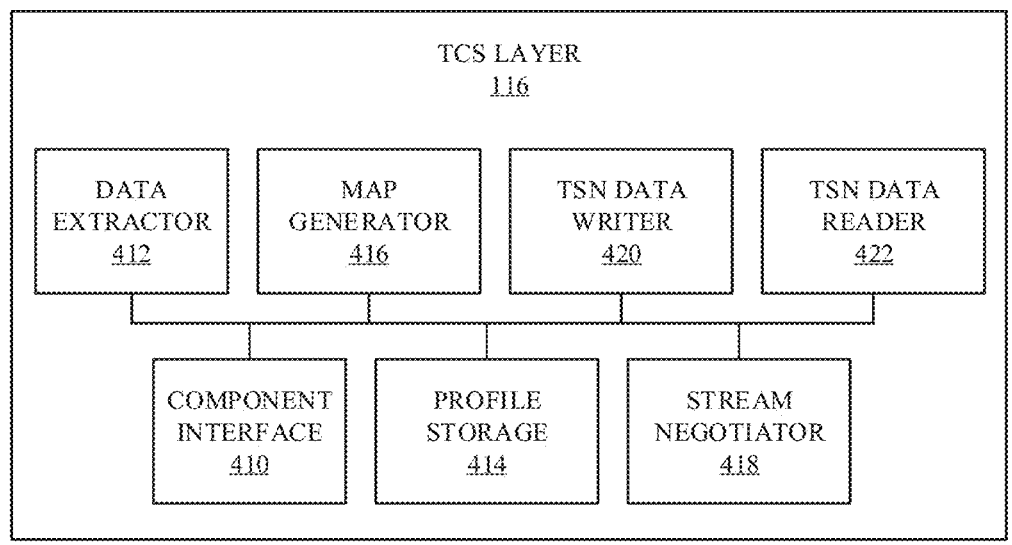
FIG. 4B is a block diagram of an implementation of the example time sensitive network configuration service layer of FIG. 1.

FIG. 4B is a block diagram of an example implementation of the TCS layer 116 of FIG. 1. The example TCS layer 116 includes an example component interface 410, an example data extractor 412, an example profile storage 414, an example map generator 416, an example stream negotiator 418, an example time sensitive network data writer (TSN data writer) 420, and an example time sensitive network data reader (TSN data reader) 422. As described above, the components of the TCS layer 116 may be distributed across multiple devices of the network of FIG. 1. For example, the component interface 410, the data extractor 412, the profile storage 414, the map generator 416, and the TSN data writer 420 may be implemented in the STA 102a of FIG. 1 and the component interface 410, the profile storage 414, the stream negotiated 418, and the TSN data reader 422 may be implemented in the STA 102b.

The example component interface 410 of FIG. 4A interfaces with other components of the device that is implementing the TCS layer 116. For example, the device implementing the TCS layer 116 may include radio architecture to transmit and/or receive topics. Accordingly, the example component interface 410 can obtain topics received using the radio architecture and/or instruct (e.g., cause) the radio architecture to send topics.

The example data extractor 412 of FIG. 4 extracts a TSN profile from obtained QoS policy information. The TSN profile corresponds to the network QoS guarantees that the application layer of the publishing device desires for the topic transmission. The example data extractor 412 stores the extracted TSN profile in the example profile storage 414.

The example map generator 416 of FIG. 4 maps the TSN data writer 420 to the data writer 406 of the DDS layer 114, from which the QoS policy information was obtained. The example map generator 416 instructs the radio architecture (e.g., via the component interface 410) to transmit the mapping of the TSN data writer 420 of the TCS layer 116 to the data writer 406 of the DDS layer 114. In this manner, the DDS layer 114 will transmit topics to the TSN data writer 420 to transmit to the TSN data reader 422 via an established channel at the TCS layer 116.

The example stream negotiator 418 of FIG. 4 negotiates with the example CNC 112 and/or the example CUC 118 to establish a data stream at the TCS layer 116 that satisfies the QoS guarantees of the TSN profile. For example, the stream negotiator 418 obtains the TSN profile corresponding to a topic that a subscriber is attempting to subscribe to (e.g., by accessing the TSN profile in the example profile storage 414). The stream negotiator 418 uses the details of the TSN profile to transmit request (e.g., using the radio architecture of the implementing device via the component interface 410) to the example CNC 112 and/or the example CUC 118 to schedule a stream that satisfies the details of the TSN profile (e.g., the QoS guarantees). If the stream negotiator 418 is not able to negotiate a stream that satisfies the details of the TSN profile, the stream negotiator 418 transmits an error message to the subscribing STA (e.g., the STA 102b).

The example TSN data reader 422 of FIG. 4B obtains topics from the example TSN data writer 420 via the established stream. After a data stream is obtained, the TSN data reader 422 transmits the topic to the data reader at the DDS layer of the subscribing device. In this manner, the subscriber obtains the topic and the QoS guarantees are satisfied.

Figure 5:
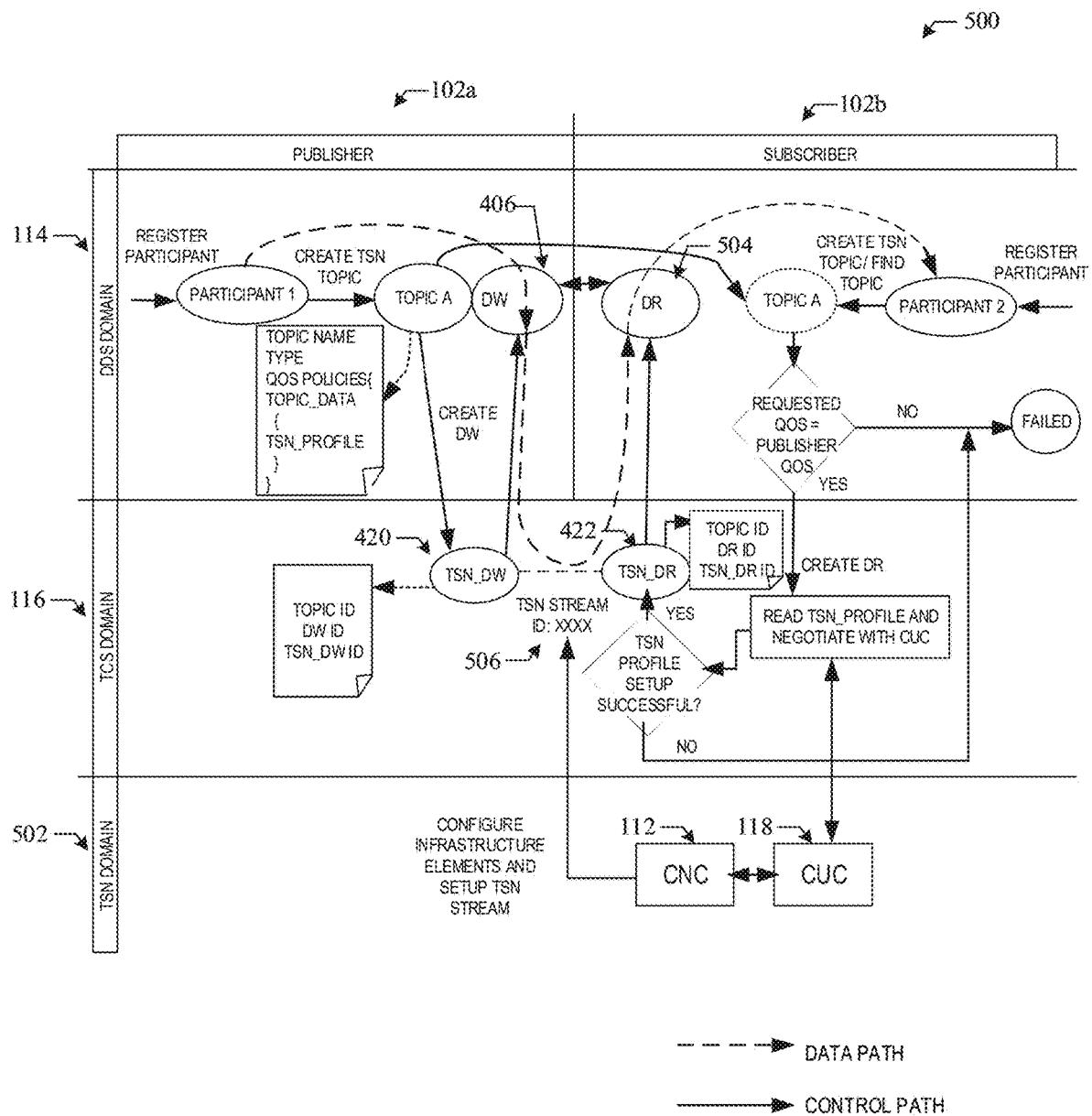
FIG. 5 is an example diagram illustrating an assurance of QoS guarantees from application middleware services in a time-sensitive network.

FIG. 5 is an example diagram 500 illustrating an assurance of QoS guarantees from application middleware services in a time-sensitive network. The example diagram 500 includes an example publisher (e.g. implemented by the STA 102a), an example subscriber (e.g., implemented by the STA 102b), the example CNC 112, the example data distributed service domain (DDS domain) (or layer) 114, the example time sensitive network configuration service domain (TCS domain) (e.g., layer) 116, and the example CNC 118 of FIG. 1. The example diagram 500 further includes the example data writer 406, the example TSN data writer 420, the example TSN data reader 422 of FIG. 4. The example diagram 500 further includes an example time sensitive network domain (TSN) domain (e.g. layer) 502, an example data reader 504, and an example time sensitive network data stream (TSN data stream) 506.

The example publisher 102a of FIG. 5 receives instructions from an application running on the publisher 102a to register a participant to publish topic A. The instructions further include the TSN profile generated by the application. In response to receiving the instructions, the publisher 102a transmits a QoS policy including the TSN profile to the TSN data writer 420 of the example TCS domain 116. The TCS domain 116 generates a mapping of the TSN data writer 420 to the data writer 406 of the publisher 102a and transmits the mapping to the data writer 406 of the publisher 102a in the DDS domain 114.

If the application of the subscriber 102b determines that it wants to subscribe to topic A, the application will send instructions with corresponding subscriber side QoS guarantees (e.g., requested QoS). If the STA 102b determines that the subscriber side QoS guarantees do not match the publisher QoS guarantees, the subscriber 102 will not subscribe to topic A. If the STA 102b determines that the subscriber side QoS guarantees do match the publisher QoS guarantees, the subscriber 102b transmits a request to subscribe to the TCS domain 116. The TCS domain 116 obtains the TSN profile and negotiates with the CNC 112 and/or the CUC 118 in the TSN domain 502. If the negotiation is successful, the CNC 112 generates the TSN stream 506 to connect to the TSN data writer 420 and the TSN data reader 422 for the Topic A.

After the TSN stream 506 is established, any topics that the DDS domain 114 of the STA 102a obtains from the application is transmitted from the data writer 406 to the TSN data writer 420. In this manner, the TSN data writer 420 can transmit the topic to the example TSN data reader 422 via the TSN stream 506 and the TSN data reader 422 can transmit the topic to the data reader 504 in the DDS domain 114 of the subscriber 102b. In this manner, the topic is transmitted via the TSN data stream 506 while ensuring the QoS guarantees from the DDS domain 114.

While an example manner of implementing the data collector 110, the CNC 112, the DDS layer 114, and the TCS layer 116 of FIG. 1 is illustrated in FIGS. 2A, 2B, 4A, and/or 4B, one or more of the elements, processes and/or devices illustrated in FIGS. 2A, 2B, 4A, and/or 4B may be combined, divided, re-arranged, omitted, eliminated and/or implemented in any other way. Further, the example component interface 200, the example clock 202, the example schedule controller 204, the example data packet controller 206, the example flag generator 208, the example link performance calculator 210, the example component interface 220, the example report generator 222, the example data organizer 224, the example issue mitigator 226, the example component interface 400, the example data manipulator 402, the example mapping data writer 406, the example mapping storage 408, the example component interface 410, the example data extractor 412, the example profile storage 414, the example map generator 416, the example stream negotiator 418, the example TSN data writer 420, the example TSN data reader 422, and/or, more generally, the example data collector 110, the example CNC 113, the example DDS layer 114, and/or the example TCS layer 116 of FIGS. 2A, 2B, 4A, and/or 4B may be implemented by hardware, software, firmware and/or any combination of hardware, software and/or firmware. Thus, for example, any of the example component interface 200, the example clock 202, the example schedule controller 204, the example data packet controller 206, the example flag generator 208, the example link performance calculator 210, the example component interface 220, the example report generator 222, the example data organizer 224, the example issue mitigator 226, the example component interface 400, the example data manipulator 402, the example mapping data writer 406, the example mapping storage 408, the example component interface 410, the example data extractor 412, the example profile storage 414, the example map generator 416, the example stream negotiator 418, the example TSN data writer 420, the example TSN data reader 422, and/or, more generally, the example data collector 110, the example CNC 113, the example DDS layer 114, and/or the example TCS layer 116 of FIGS. 2A, 2B, 4A, and/or 4B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 200, the example clock 202, the example schedule controller 204, the example data packet controller 206, the example flag generator 208, the example link performance calculator 210, the example component interface 220, the example report generator 222, the example data organizer 224, the example issue mitigator 226, the example component interface 400, the example data manipulator 402, the example mapping data writer 406, the example mapping storage 408, the example component interface 410, the example data extractor 412, the example profile storage 414, the example map generator 416, the example stream negotiator 418, the example TSN data writer 420, the example TSN data reader 422, and/or, more generally, the example data collector 110, the example CNC 113, the example DDS layer 114, and/or the example TCS layer 116 of FIGS. 2A, 2B, 4A, and/or 4B is/are hereby expressly defined to include a non-transitory computer readable storage device or storage disk such as a memory, a digital versatile disk (DVD), a compact disk (CD), a Blu-ray disk, etc. including the software and/or firmware. Further still, the example data collector 110, the example CNC 113, the example DDS layer 114, and/or the example TCS layer 116 of FIGS. 2A, 2B, 4A, and/or 4B may include one or more elements, processes and/or devices in addition to, or instead of, those illustrated in FIG. 2A, 2B, 4A, and/or 4B, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the example data collector 110, the example CNC 113, the example DDS layer 114, and/or the example TCS layer 116 of FIG. 1 is shown in FIGS. 6A-10. The machine readable instructions may be one or more executable programs or portion(s) of an executable program for execution by a computer processor and/or processor circuitry, such as the processor 1212, 1312, 1412, 1512 shown in the example processor platform 1210, 1310, 1410, 1510 discussed below in connection with FIGS. 12-15. The program may be embodied in software stored on a non-transitory computer readable storage medium such as a CD-ROM, a floppy disk, a hard drive, a DVD, a Blu-ray disk, or a memory associated with the processor 1212, 1312, 1412, 1512 but the entire program and/or parts thereof could alternatively be executed by a device other than the processor 1012 and/or embodied in firmware or dedicated hardware. Further, although the example program is described with reference to the flowchart illustrated in FIG. 6A-10, many other methods of implementing the example data collector 110, the example CNC 113, the example DDS layer 114, and/or the example TCS layer 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6A-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B. (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6A:
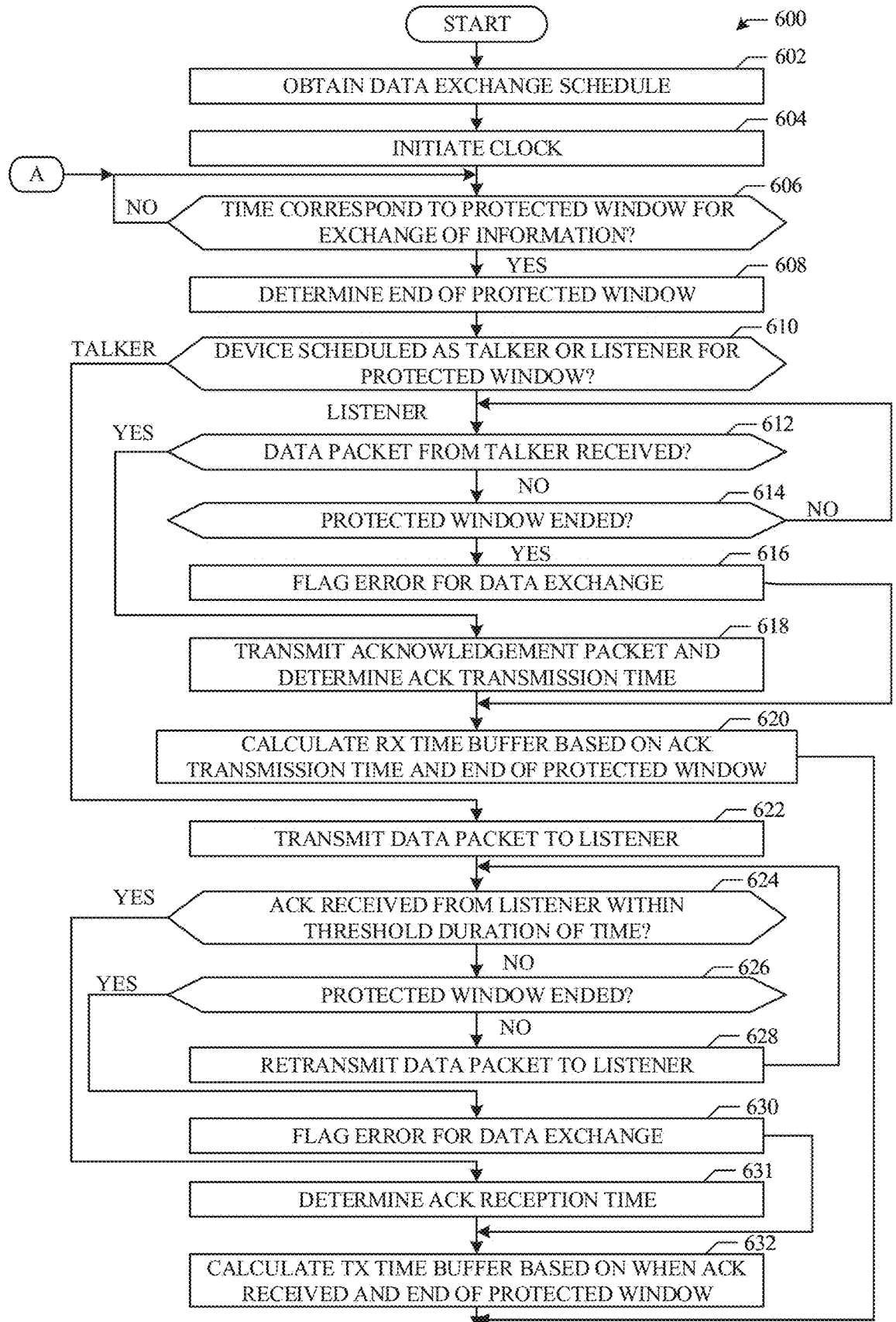
FIGS. 6A-6B illustrate a flowchart representative of machine readable instructions which may be executed to implement the example data collector of FIG. 2A.
Figure 6B:
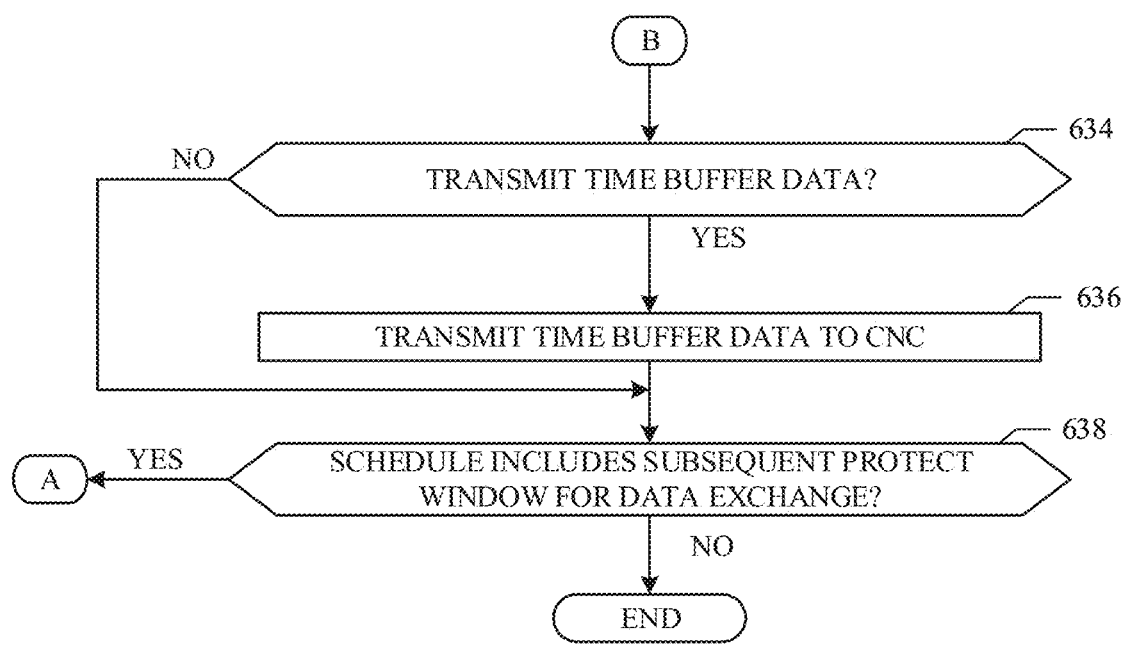

FIGS. 6A and 6B illustrate an example flowchart representative of example machine readable instructions 600 that may be executed by the example data collector 110 of FIG. 2A (e.g., implemented in any one of the example STA 102a, 102b, the example AP 104, a bridge, and/or any other device that participates in a data exchange) to collect link performance information (e.g., metrics). Although the flowchart of FIGS. 6A and 6B is described in conjunction with the example data collector 110 of FIG. 2 in the environment 100 of FIG. 1, the instructions may be executed by any data collected in any environment.

At block 602, the example component interface 200 obtains the data exchange schedule from the CNC 112 via radio architecture of the device that implements the data collector 110. The data exchange schedule is a global schedule that is known by all devices participating in the network. The global schedule includes the protected windows where particular devices (e.g., defined in the global schedule) can exchange data. At block 604, the clock 202 is initiated so that the schedule controller 204 can determine when the particular window corresponding to a data exchange for the implementing device occurs based on the clock and the schedule.

At block 606, the example schedule controller 204 determines if the current time corresponds to a protected window for an exchange of information based on the clock 202. If the example schedule controller 204 determines that the current time does not correspond to the protected window (block 606: NO), control returns to block 606 until the time corresponding to the protected window occurs. If the example schedule controller 204 determines that the current time corresponds to the protected window (block 606: YES), the example schedule controller 205 determines a time corresponding to the end of the protected window based on the data exchange schedule (block 608).

At block 610, the example schedule controller 204 determines if the implementing device (e.g., the device that is implementing the data collector 110) is scheduled as the talker or lister for the protected window. If the example schedule controller 204 determines that the implementing device is scheduled as the talker (block 610: TALKER), control continues to block 622, as further described below. If the example schedule controller 204 determines that the implementing device is scheduled as the listener (block 610: LISTENER), the example data packet controller 206 determines if a data packet from the talking device was received by the radio architecture of the implementing device (block 612).

If the example data packet controller determines that the data packet from the talking device was not received by the radio architecture of the implementing device (block 612: NO), the example schedule controller 204 determines if the protected window has ended (e.g., based on the schedule and the clock 202) (block 614). If the example schedule controller 204 determines that the protected window has not ended (block 614: NO), control returns to block 612. If the example schedule controller 204 determines that the protected window has ended (block 614: YES), the example flag generator 208 flags an error for the data exchange (block 616) and control continues to block 620.

If the example data packet controller determines that the data packet from the talking device was received by the radio architecture of the implementing device (block 612: YES), the example data packet controller 206 instructs the radio architecture of the implementing device (e.g., via the component interface 200) to transit an ACK packet and determines the ACK transmission time using the example clock 202 (block 618). At block 620, the example link performance calculator 210 calculates the Rx timer buffer based on the ACK transmission time and the end of the protected window (e.g., RxTBuf=RX_Rwe-Rx_Tdone).

If the example schedule controller 204 determines that the implementing device is scheduled as the talker (block 610: TALKER), the example data packet controller 206 transmits a data packet (e.g., a TSN data frame) to the listening device using the ratio architecture of the implementing device via the component interface 200 (block 622). At block 624, the example data packet controller 206 determines if an ACK is received from the listening device at the radio architecture of the implementing device via the component interface 200. If the example data packet controller 206 determines that the ACK was received (block 624: YES), control continues to block 632, as further described below.

If the example data packet controller 206 determines that the ACK was not received (block 624: NO), the example schedule controller 204 determines if the protected window has ended (e.g., based on the schedule and the clock 202) (block 626). If the example schedule controller 204 determines that the protected window has not ended (block 626: NO), the example data packet controller 206 causes the radio architecture of the implementing device (e.g., via the component interface 200) to retransmit the data packet (e.g., the TSN data frame) to the listening device and control returns to block 628. If the example schedule controller 204 determines that the protected window has ended (block 626: YES), the example flag generator 208 flags the error for the data exchange (block 630) and control continues to block 632.

If the example data packet controller 206 determines that the ACK was received (block 624: YES), the example data packet controller 206 determines the ACK reception time using the example clock 202 (block 631). At block 632, the example link performance calculator 210 calculates the Tx timer buffer based on the time when the ACK transmission was received and the end of the protected window (e.g., TxTBuf=TX_Twe-Tx_Tdone). At block 634, the example data packet controller 206 determines if the time buffer data should be transmitted to the example CNC 112. The data collector 110 may transmit time buffer data after each data exchange, after a threshold number of data exchanges, when an error was flagged, etc. The decision of when the data collector 110 is to transmit determined time buffer data may be based on user and/or manufacturer preferences. If the example data packet controller 206 determines that the time buffer data should not be transmitted (block 634: NO), control continues to block 638.

If the example data packet controller 206 determines that the time buffer data should not be transmitted (block 634: YES), the example data packet controller 206 transmits the buffer data to the CNC using the radio architecture of the implementing device (e.g., via the component interface 200) (block 636). The time buffer data may include flagged errors, and/or any other relevant information. At block 638, the example schedule controller 204 determines if the schedule includes a subsequent protected window for a data exchange. If the example schedule controller 204 determines that the schedule includes a subsequent protected window for a data exchange (block 638: YES), control returns to block 606. If the example schedule controller 204 determines that the schedule does not include a subsequent protected window for a data exchange (block 638: NO), control ends.

Figure 7:
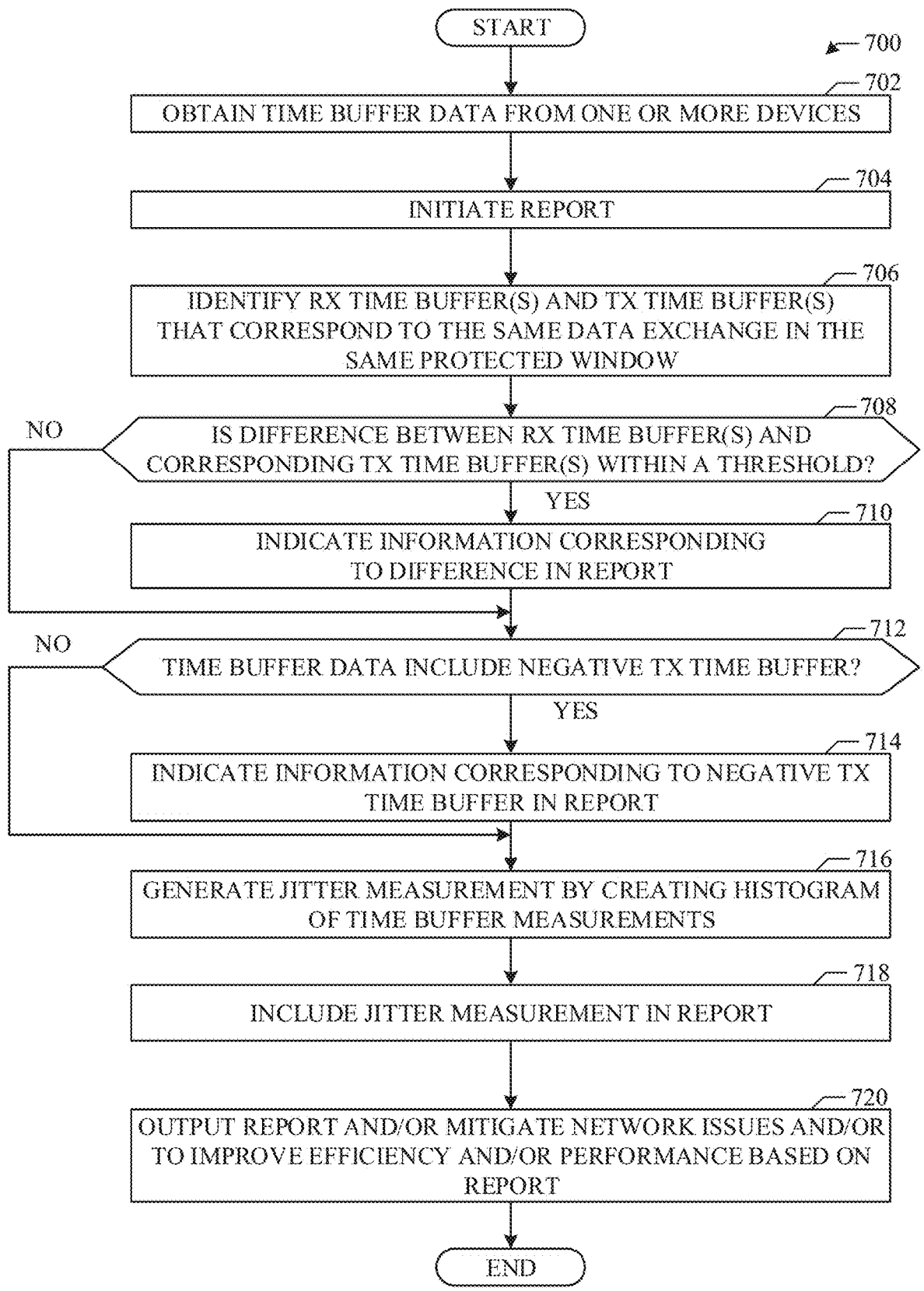
FIG. 7 illustrates a flowchart representative of machine readable instructions which may be executed to implement the example central network configuration of FIG. 2B.

FIG. 7 illustrates an example flowchart representative of example machine readable instructions 700 that may be executed by the CNC 112 of FIG. 2B (e.g., implemented in any one of the example STA 102a, 102b, the example AP 104, a bridge, the server 108, and/or any other device that participates in a data exchange) to process time buffer information (e.g., metrics). Although the flowchart of FIG. 7 is described in conjunction with the example CNC 112 of FIG. 2 in the environment 100 of FIG. 1, the instructions may be executed by any CNC in any environment.

At block 702, the example component interface 220 obtains time buffer data from one or more devices (e.g., one or more of the STAs 102a, 102b, the AP 104, a bridge, etc.) involved in a data exchange. At block 704, the example report generator 222 initiates a report corresponding to the buffer time data. At block 706, the example data organizer 224 identifies Rx time buffer(s) and Tx time buffer(s) that correspond to the same data exchange in the same protected window.

At block 708, the example data organizer 224 determines if the difference between the Rx time buffer(s) and the corresponding Tx time buffer(s) is within a threshold. As described above, if no errors occur the Tx time buffer and corresponding Rx time buffer should be close (e.g., within a threshold). If there is an error or a retransmission of the ACK, the Rx time buffer and the Tx time buffer will not be close (e.g., outside the threshold). Accordingly, if the example data organizer 224 determines that the difference between the Rx time buffer(s) and the corresponding Tx time buffer(s) is within a threshold (block 708: YES), the report generator 222 indicates information corresponding to the difference in the report (block 710).

At time 712, the example data organizer 224 determines if the time buffer data includes a negative Tx time buffer. As described above, a negative Tx time buffer corresponds to either the transmitting device not receiving the ACK (e.g., which will be flagged as an error in the time buffer data), or the transmitting device receiving the ACK after the protected window ends. If the example data organizer 224 determines that the time buffer data includes a negative Tx time buffer (block 712: YES), the example report generator 222 indicates the information corresponding to the negative Tx time buffer in the report (block 714).

At block 716, the example data organizer 224 generates a jitter measurement by creating a histogram (or a data structure corresponding to a histogram) of the time buffer measurements. At block 718, the example report generator 222 includes the jitter measurement in the report. At block 720, the example component interface 220 outputs the report and/or the issue mitigator 226 mitigates network issues (e.g., by increasing redundancy and/or retransmissions), improves efficiency (e.g., by decreasing the length of the protected window), and/or improves performance (e.g., by increasing the length of the protected window) based on the report. The example component interface 220 may output the report to a user interface and/or to another device or component (e.g., via wired or wireless connection).

Figure 8:
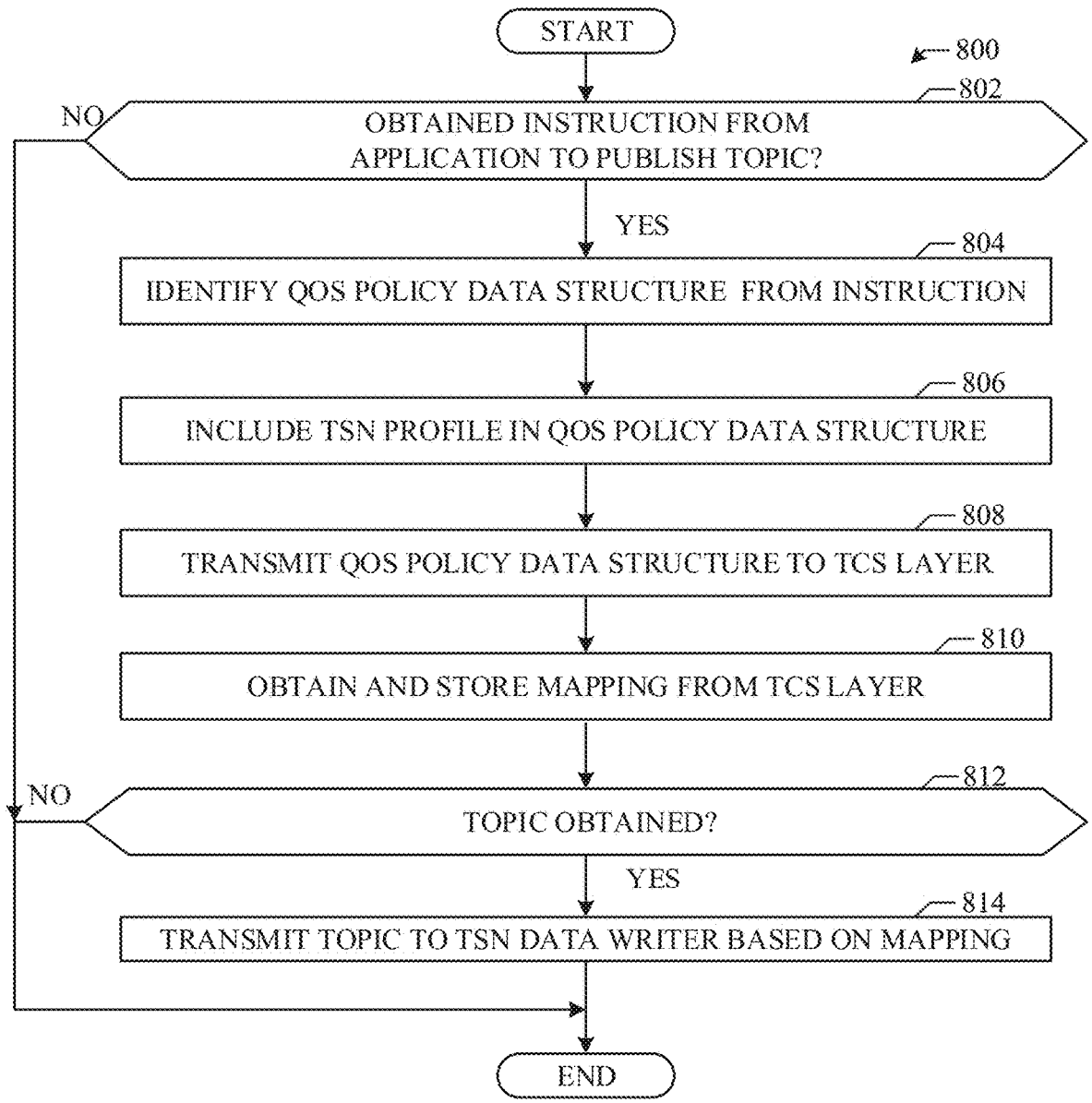
FIG. 8 illustrates a flowchart representative of machine readable instructions which may be executed to implement the example data distributed service layer of FIG. 4A.

FIG. 8 illustrates an example flowchart representative of example machine readable instructions 800 that may be executed by the DDS layer 114 of FIG. 4A (e.g., implemented in any one of the example STA 102a, 102b, the example AP 104, a bridge, and/or any other device that acks as a publisher) to ensure that topic transmission adheres to QoS guarantees. Although the flowchart of FIG. 7 is described in conjunction with the example DDS layer 114 of FIG. 4A in the environment 100 of FIG. 1, the instructions may be executed by any DDS layer in any environment.

At block 802, the data manipulator 402 determines if instructions from an application of the implementing device to publish a topic has been obtained via the component interface 400. If the data manipulator 402 determines that instructions to publish a topic has not been obtained (block 802: NO), control ends. If the data manipulator 402 determines that instructions to publish a topic has been obtained (block 802: YES), the example data manipulator 402 identifies the QoS policy data structure from the instruction (block 804). At block 806, the example data manipulator 402 includes a TSN profile in the QoS policy data structure (e.g. overloads the QoS policy data structure with the TSN profile. The application provides the TSN profile to the DDS layer 114 via the component interface 400.

At block 808, the data manipulator 402 transmits the overloaded QoS policy data structure to the TCS layer 136 (e.g., using the radio architecture of the implementing device via the component interface 400). At block 810, the example mapping storage 408 obtains (e.g., via the component interface 400) and stores a mapping from the TCS layer 116. The mapping maps the data writer 406 to a TSN data writer 420 at the TCS layer 116. In this manner, the data writer 406 transmits data to subscribing devices via the TSN data writer 420 (e.g., instead of directly to a data reader in the DDS layer of the subscribing device).

At block 812, the example data writer 406 determines if a topic has been obtained from an application via the component interface 400. If the data writer 406 determines that a topic has not been obtained (block 812: NO), control ends. If the data writer 406 determines that a topic has been obtained (block 812: YES), the example data writer 406 transmits the topic to the TSN data writer 420 of the TCS layer 116 based on the mapping (block 814).

Figure 9:
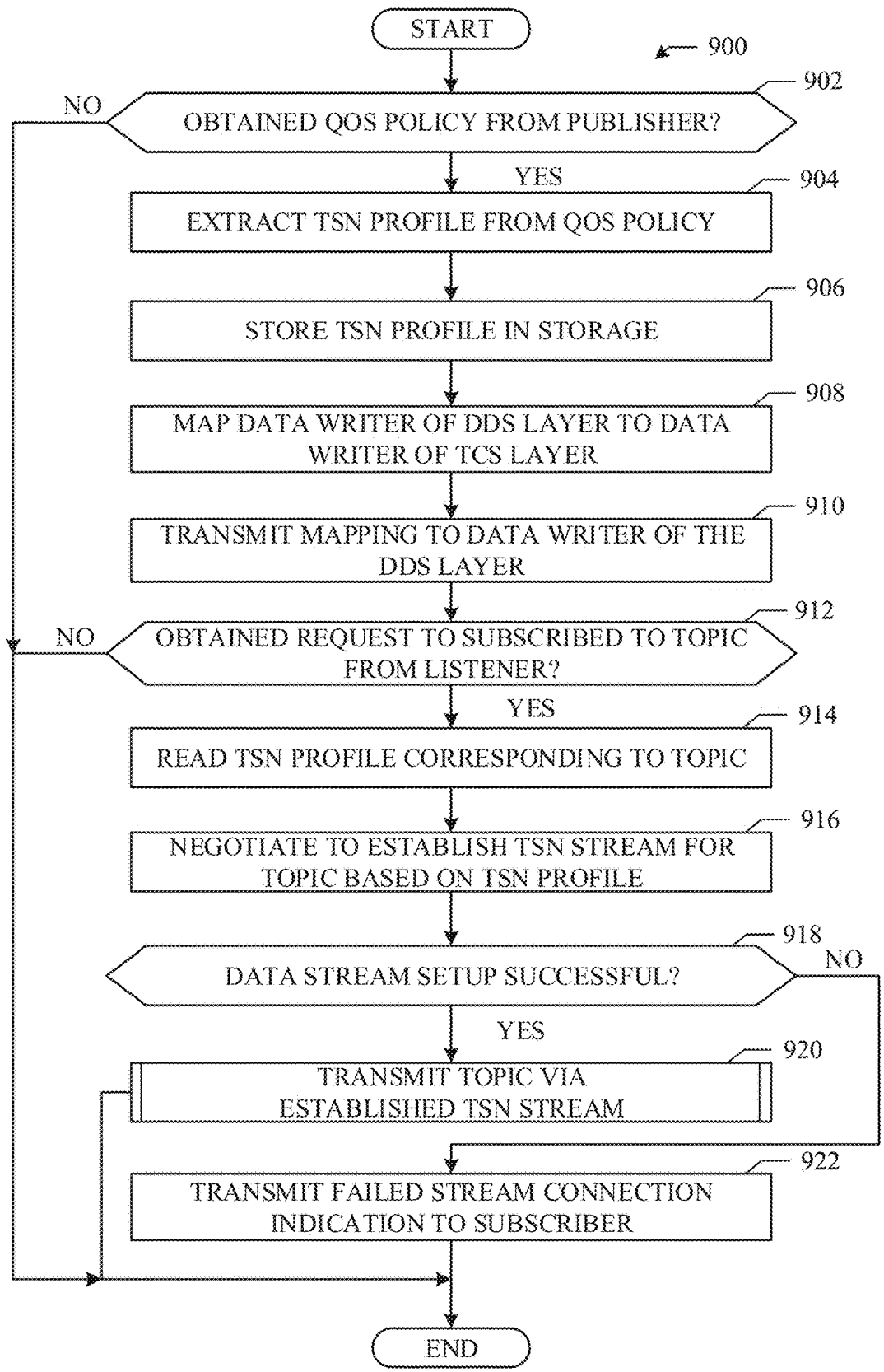
FIGS. 9-10 illustrate a flowchart representative of machine readable instructions which may be executed to implement the example time sensitive network configuration service layer of FIG. 4B.

FIG. 9 illustrates an example flowchart representative of example machine readable instructions 800 that may be executed by the TCS layer 116 of FIG. 4B (e.g., one or more of example STA 102a, 102b, the example AP 104, a bridge, and/or any other TSN device) to ensure that topic transmission adheres to QoS guarantees. Although the flowchart of FIG. 9 is described in conjunction with the example TCS layer 116 of FIG. 4B in the environment 100 of FIG. 1, the instructions may be executed by any TCS layer in any environment.

At block 900, the example data extractor 412 determines if a QoS policy has been obtained (e.g., via the component interface 410 and radio architecture of the implementing device) from the DDS layer 114 of a publishing device. If the example data extractor 412 determines that a QoS policy has not been obtained (block 902: NO), control ends. If the example data extractor 412 determines that a QoS policy has been obtained (block 902: YES), the example data extractor 412 extracts the TSN profile from the QoS policy data structure (block 904). At block 906, the example profile storage 414 stores the TSN profile. The storage 414 may be included in the device that extracts the TSN profile and/or may be included in a different device.

At block 908, the example map generator 416 maps the TSN data writer 420 of the TCS layer 116 to the data writer 406 of the DDS layer 114 from which the QoS policy was obtained from. At block 910, the example map generator 416 transmits the mapping to the data writer 406 of the DDS layer 114 via the radio architecture of the implementing device using the component interface 410. At block 912, the example stream negotiator 418 determines if a request from a subscriber to the topic of the publisher has been obtained from a listener (e.g., via the component interface 410). The example stream negotiator 418 may be implemented in a device different from the device that obtains the QoS policy from the publisher.

If the example stream negotiator 418 determines that the request from the subscriber has not been obtained (block 912: NO), control ends. If the example stream negotiator 418 determines that the request from the subscriber has been obtained (block 912: YES), the example stream negotiator 418 reads the TSN profile corresponding to the topic (e.g., the TSN profile stored in the profile storage 414) (block 914). At block 916, the example stream negotiator 418 negotiates with the CNC 112 and/or the CUC 118 to establish a TSN stream for the topic based on the TSN profile (e.g., to satisfy the QoS guarantees defined in the TSN profile). At block 918, the example stream negotiator 418 determines if the stream setup was successful (e.g., whether the stream negotiator 418 was able to establish the stream to satisfy the QoS guarantees).

If the example stream negotiator 418 determines that the data stream setup was successful (block 918: YES), the example TCS layer 116 transmits the topic from the publisher to the subscriber via the established TSN stream (e.g., the example TSN stream 506 of FIG. 5) (block 920), as further described below in conjunction with FIG. 10. If the example stream negotiator 418 determines that the data stream setup was not successful (block 918: NO), the example stream negotiator 418 transmits a failed stream connection indication to the DDS layer 114 of the subscriber (e.g., via the component interface 410) (block 922).

Figure 10:
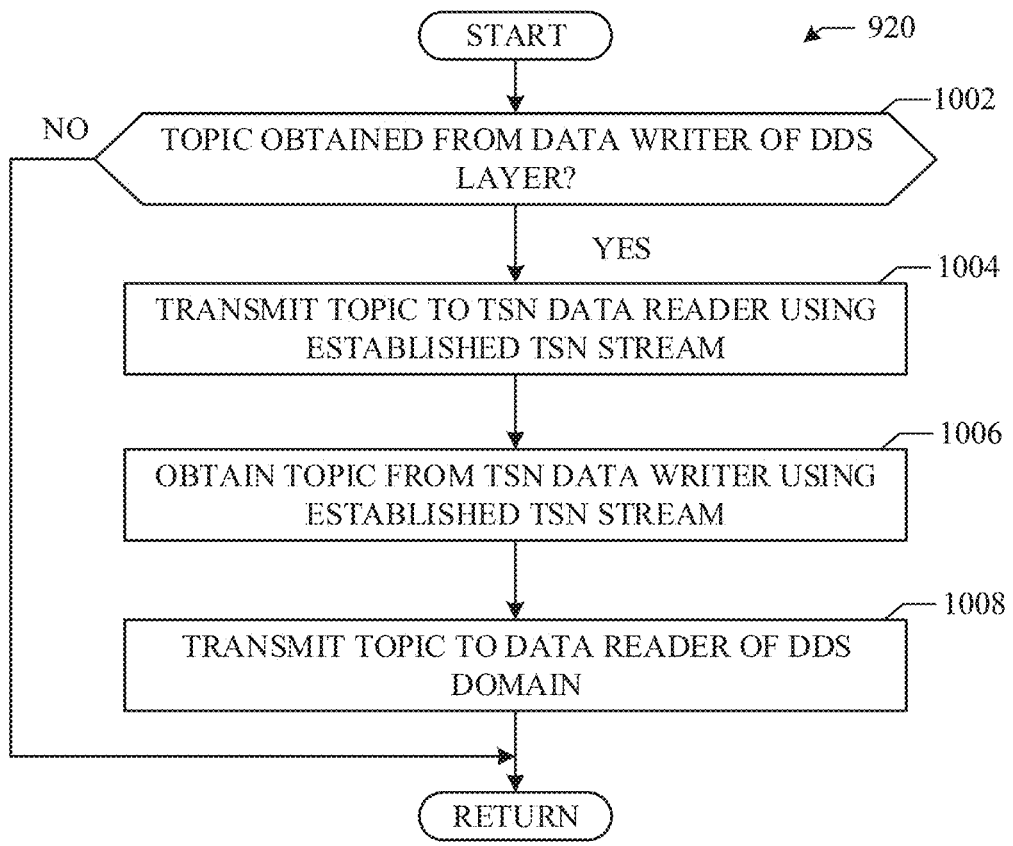

FIG. 10 illustrates an example flowchart representative of example machine readable instructions 920 that may be executed by the TCS layer 116 of FIG. 4B (e.g., one or more of example STA 102a, 102b, the example AP 104, a bridge, and/or any other TSN device) to transmit a topic via an established TSN stream, as further described above in conjunction with block 920 of FIG. 9. Although the flowchart of FIG. 10 is described in conjunction with the example TCS layer 116 of FIG. 4B in the environment 100 of FIG. 1, the instructions may be executed by any TCS layer in any environment.

At block 1002, the example TSN data writer 420 determines if a topic has been obtained (e.g., via the component interface 410) from the data writer 406 of the DDS layer 114 of a publisher. If the example TSN data writer 420 determines that a topic has not been obtained (block 1002: NO), control ends. If the example TSN data writer 420 determines that a topic has been obtained (block 1002: YES), the example TSN data writer 420 transmits the topic to the TSN data reader 422 (which may be implemented in a different device) via the established TSN stream (e.g., the example TSN data stream 506 of FIG. 5) (block 1004). At block 1006, the example TSN data reader 422 obtains the topic from the TSN data writer 420 using the established TSN stream. At block 1008, the example TSN data reader 422 transmits the topic to the data reader (e.g., the example data reader 504 of FIG. 5) in the DDS layer 114 of the subscriber device.

FIGS. 11A and 11B illustrate example data packets (also referred to as elements) and/or element type definitions that may be adjusted from a standard (e.g., a TSN standard) to include data corresponding to the link performance measurements described herein. FIG. 11A includes an example transmit stream/category measurement request element 1100 including an example subelement 1102, and an example violation indicator and triggered reporting data packet 1104 including an average error threshold subelement 1108, an example consecutive error threshold subelement 1110, an example delay threshold subelement 1112, an example measurement count subelement 1114, and an example trigger time-out subelement 1116. FIG. 11A further includes an example measurement type table 1118 including a TSS definition 1120. FIG. 11B includes an example transmit stream/category measurement report element 1122, an example reporting reason subelement 1124 an example average time buffer value subelement 1126. an example Rx time buffer subelement 1128, an example event type table 1130, and an examples TSS event type 1132. Although FIGS. 11A and 11B include example manners to indicate link performance information, the link performance information may be indicated in any data packets and/or any configuration.

The example transmit stream/category measurement request element 1100 of FIG. 11A includes the example optional subelements 1102. In some examples, time buffer information may be included in the optional subelements 1102. For example, the optional subelements 1102 may include a Tx time buffer reporting field, a Tx time buffer triggered reporting field, an Rx time buffer triggered reporting field, a Rx time buffer reporting field, a Tx time buffer violation indicator reporting field, and/or an Rx time buffer violation indication reporting field.

The example violation indicator and triggered reporting data packet 1104 of FIG. 4A includes various fields (e.g., subelements) corresponding to when a device is to report buffer time data. The example trigger conditions subelement 1106 includes a value corresponding to when time buffer data should be transmitted to the CNC 112. The average error threshold subelement 1108 includes a value representing the number of discarded MSDUs to be used as the threshold value for the average trigger conditions. The example consecutive error threshold subelement 1110 includes a value representing the number of discarded MSDUs to be used as the threshold value for a consecutive trigger condition. The example delay threshold subelement 1112 includes a delayed MSDU range (e.g., including a value representing the MSDU transmit delay at or above which an MSDU will be counted towards the delayed MSDU count threshold) and a delayed MSDU count (e.g., includes a value representing a lower bound of a bin in the transmit delay histogram). The example measurement count subelement 1114 includes a number of MSDUs (which may be used to calculate an average discard count of the average trigger condition). The example trigger time-out subelement 1116 includes a value expressed in units of 100 time units (TU), during which a measuring STA will not generate further triggered transmit stream/category measurement reports after a trigger condition has been met.

The example measurement type table 1118 of FIG. 11A corresponds to measurement types for measurement reports. Accordingly, the CNC 112 can identify the measurement type based on the corresponding value. In the measurement type table 1118, the measurement type for TSS 1120 is defined as 10. However, the measurement type may be defined as any number within the table 1118.

The example transmit stream/category measurement report element(s) 1122 of FIG. 11B includes the example reporting reason filed 1124 and the example average time buffer value 1126. The reporting reason filed 1124 includes an example Rx time buffer subfield 1128 to include the Rx time buffer. The example average time buffer value 1126 includes an average of previously calculated time buffers.

The example event type table 1130 includes event types that may be identified in the 802.11v specification. The event table 1130 includes the TSS event type corresponding to "4." In some examples, the TSS event type is included into a TSS event request element and/or a TSS event response element. The TSS event request element may include a traffic identifier and a time buffer threshold value. The TSS event response may include the traffic number and a measurement time buffer value.

Figure 12:
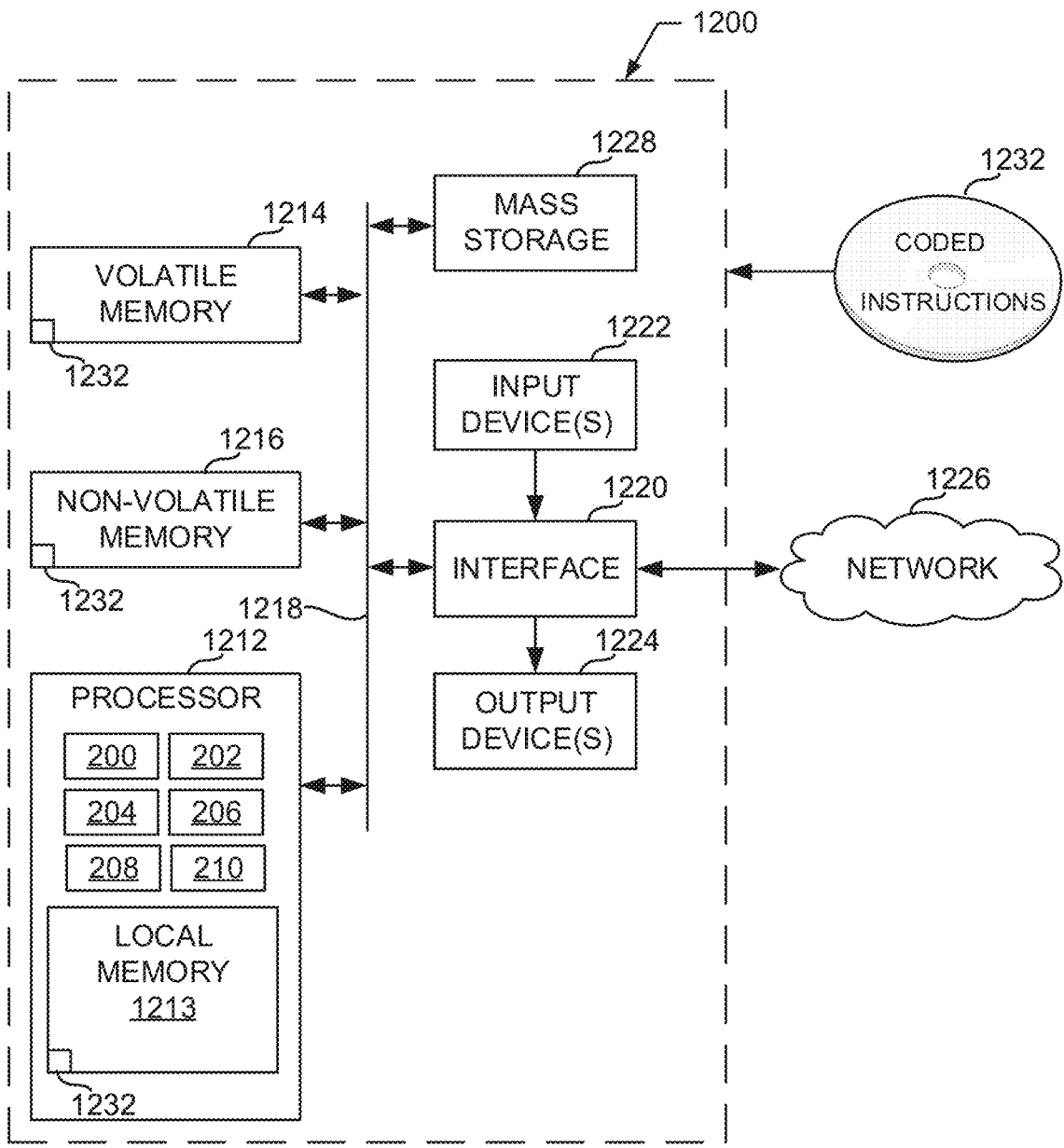
FIG. 12 is a block diagram of an example processing platform structured to execute the instructions of FIGS. 6A-6B to implement the example data collector of FIG. 2A.

FIG. 12 is a block diagram of an example processor platform 1200 structured to execute the instructions of FIGS. 6A and 6B to implement the data collector 110 of FIG. 2A. The processor platform 1200 can be, for example, a server, a station, a bridge, an access point, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the component interface 200, the clock 202, the schedule controller 204, the data packet controller 206, the flag generator 208, and the link performance calculator 210 of FIG. 2A.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 6A and 6B may be stored in the mass storage device 1228, in the volatile memory 1214, in the non-volatile memory 1216, and/or on a removable non-transitory computer readable storage medium such as a CD or DVD.

Figure 13:
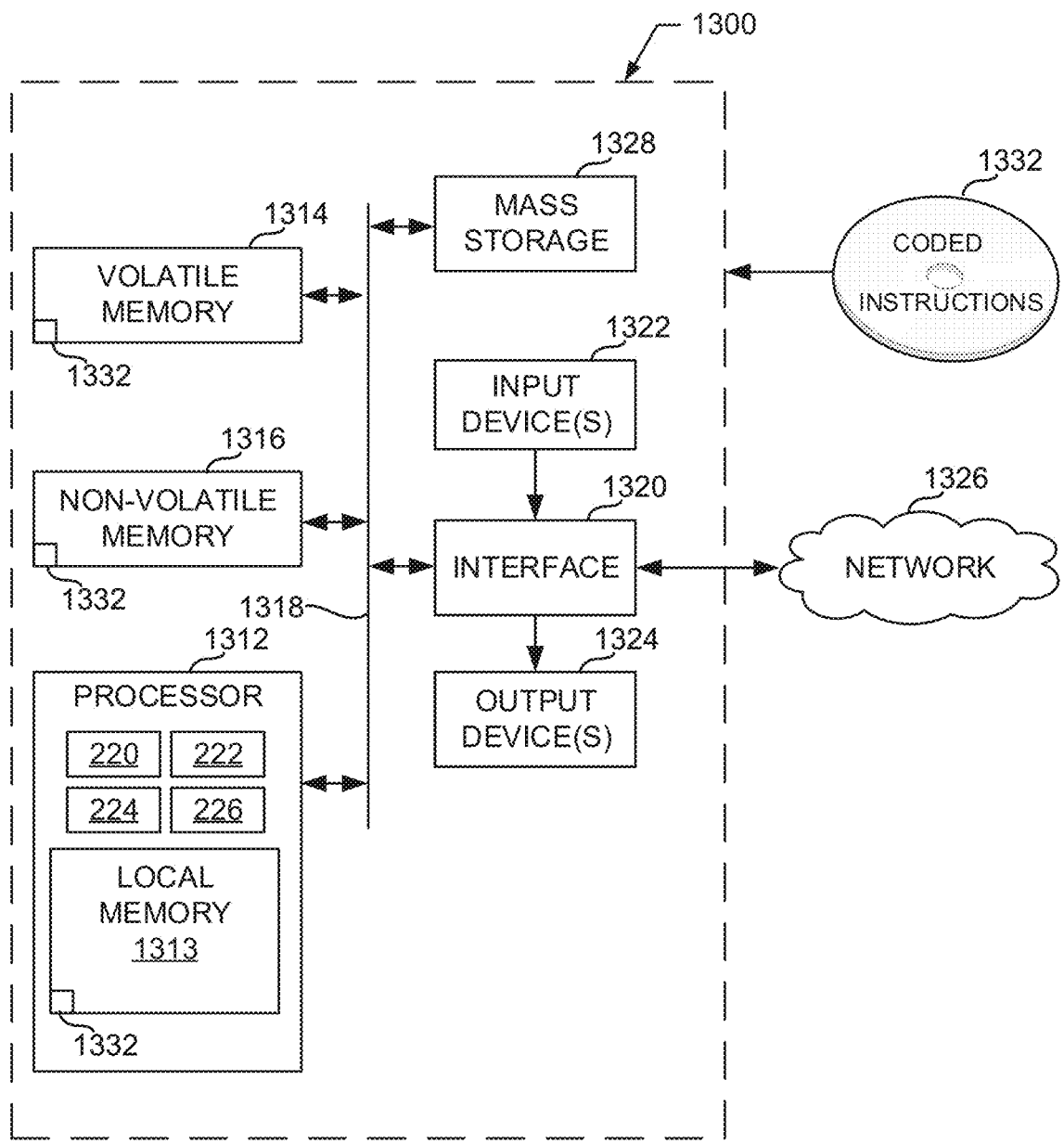
FIG. 13 is a block diagram of an example processing platform structured to execute the instructions of FIG. 7 to implement the example central network configuration of FIG. 2B.

FIG. 13 is a block diagram of an example processor platform 1300 structured to execute the instructions of FIG. 7 to implement the CNC 112 of FIG. 2B. The processor platform 1300 can be, for example, a server, a station, a bridge, an access point, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the component interface 220, the example report generator 222, the example data organizer 234, and the example issue mitigator 226 of FIG. 2B.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 7 may be stored in the mass storage device 1328, in the volatile memory 1314, in the non-volatile memory 1316, and/or on a removable non-transitory computer readable storage medium such as a CD or DVD.

Figure 14:
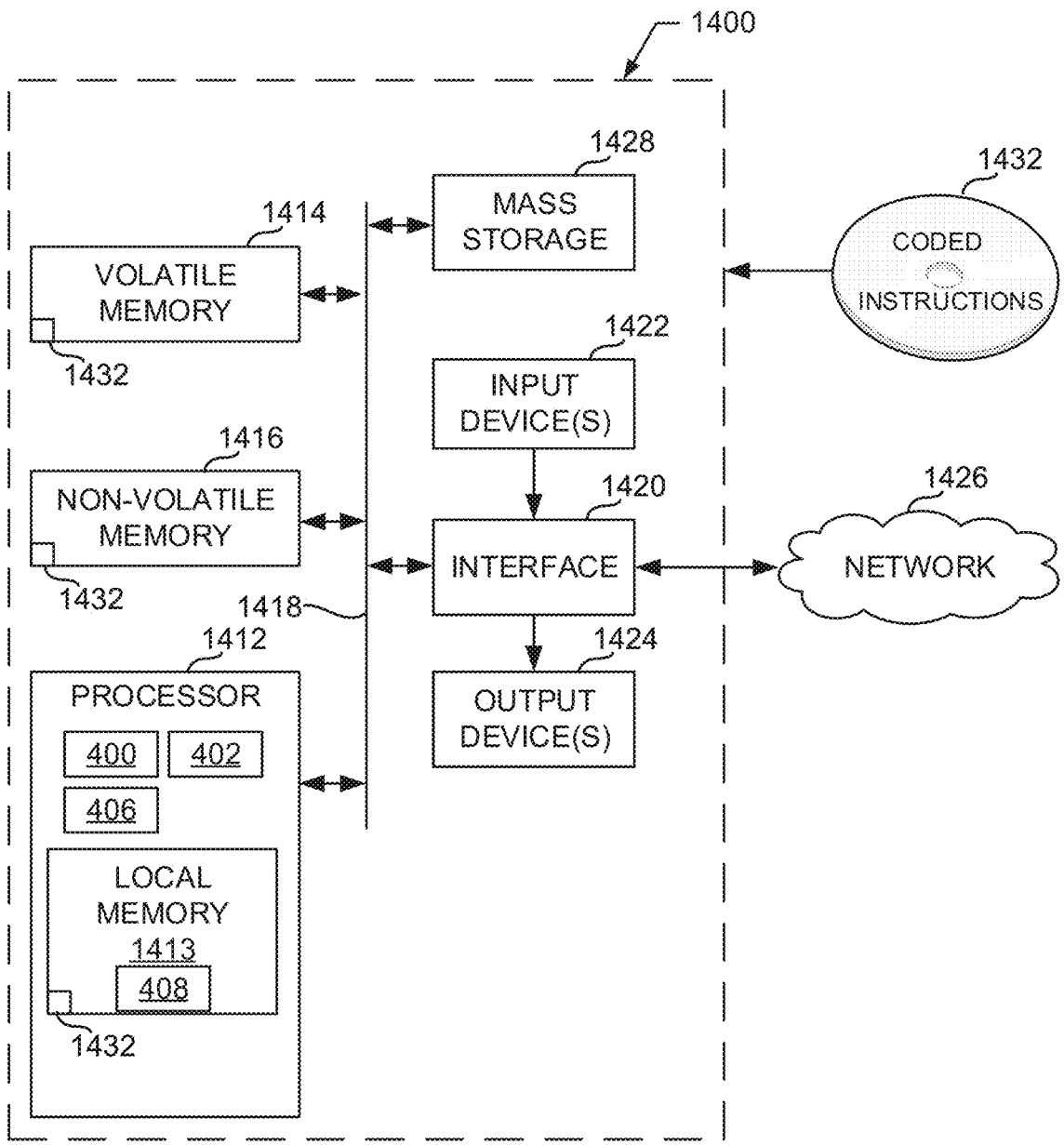
FIG. 14 is a block diagram of an example processing platform structured to execute the instructions of FIG. 8 to implement the example data distributed service layer of FIG. 4A.

FIG. 14 is a block diagram of an example processor platform 1400 structured to execute the instructions of FIG. 8 to implement the DDS layer 114 of FIG. 4A. The processor platform 1400 can be, for example, a server, a station, a bridge, an access point, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 400, the example data manipulator 402, and the example data writer 406 of FIG. 4A.

The processor 1412 of the illustrated example includes a local memory 1413 (e.g., a cache). In FIG. 14, the example local memory 1413 implements the mapping storage 408. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 8 may be stored in the mass storage device 1428, in the volatile memory 1414, in the non-volatile memory 1416, and/or on a removable non-transitory computer readable storage medium such as a CD or DVD.

Figure 15:
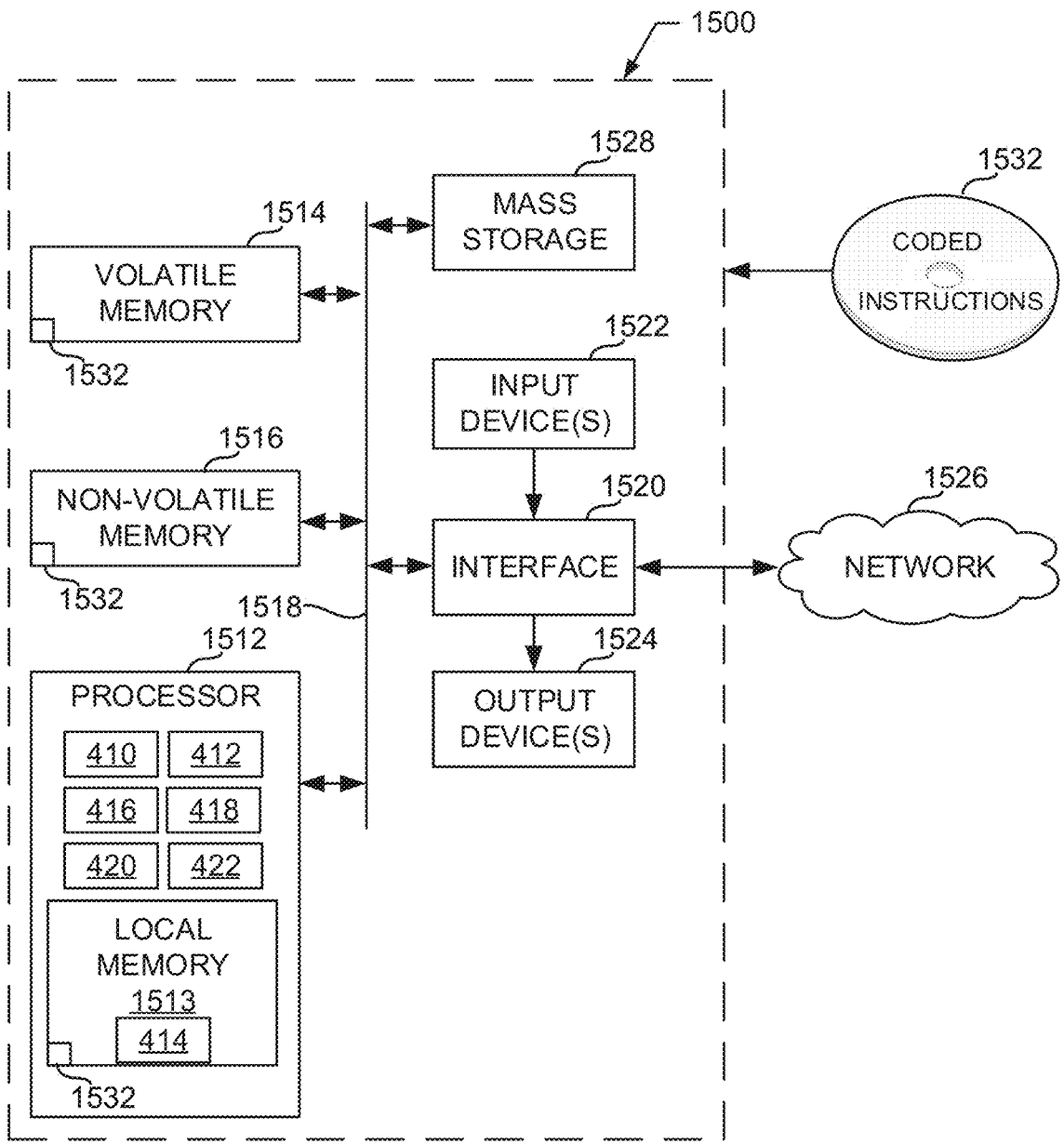
FIG. 15 is a block diagram of an example processing platform structured to execute the instructions of FIGS. 9-10 to implement the example time sensitive network configuration service layer of FIG. 4B.

FIG. 15 is a block diagram of an example processor platform 1500 structured to execute the instructions of FIGS. 9 and/or 10 to implement the TCS layer 116 of FIG. 4B. The processor platform 1500 can be, for example, a server, a station, a bridge, an access point, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor (e.g., or multiple processors if implemented in multiple devices) implements the example component interface 410, the example data extractor 412, the example map generator 416, the example stream negotiator 418, the example TSN data writer 420, and the example TSN data reader 422 of FIG. 4B.

The processor 1512 of the illustrated example includes a local memory 1513 (e.g., a cache). In FIG. 15, the example local memory 1513 implements the profile storage 414. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 9 and 10 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that facilitate data transmission. The disclosed methods, apparatus and articles of manufacture measure link performance data to adjust a data exchange schedule to improve performance and/or increase efficiency. Additionally, the disclosed method, apparatus, and articles of manufacture improve the efficiency of a computing device by ensuring that QoS guarantees from applications are satisfied at the TSN layer of a network. The disclosed methods, apparatus and articles of manufacture are accordingly directed to one or more improvement(s) in the functioning of a computer.

Example methods, apparatus, systems, and articles of manufacture to facilitate data transmission are disclosed herein. Further examples and combinations thereof include the following: Example 1 includes an apparatus comprising a schedule controller to determine a first time corresponding to an end of a window for a data exchange, a data packet controller to determine a second time corresponding to an acknowledgement send during the window, a link performance calculator to calculate link performance based on the first time and the second time, and an interface to transmit the link performance to a network configuration entity.

Example 2 includes the apparatus of example 1, wherein the schedule controller is to determine the first time based on a previously obtained global schedule.

Example 3 includes the apparatus of examples 1-2, wherein the data packet controller is to generate a data frame for a listening device, and the interface is to transmit the data frame to the listening device, and obtain the acknowledgement from the listening device, the second time corresponding to when the acknowledgement was obtained from the listening device.

Example 4 includes the apparatus of examples 1-3, wherein the data packet controller is to generate the acknowledgement in response to obtaining a data frame to a talking device, and the interface is to transmit the acknowledgement to the talking device, the second time corresponding to when the acknowledgement was transmitted.

Example 5 includes the apparatus of examples 1-4, further including a flag generator to flag an error when at least one of the acknowledgement is not received within the window, the acknowledgement is not transmitted within the window, or a data frame is not obtained within the window.

Example 6 includes the apparatus of examples 1-5, wherein the link performance calculator is to calculate the link performance based on a difference between the first time and the second time.

Example 7 includes the apparatus of examples 1-6, wherein the interface is to transmit the link performance to the network configuration entity to at least one of mitigate an error or adjust a length of the window to increase performance or efficiency.

Example 8 includes a computer readable storage medium comprising instructions which, when executed, cause one or more processors to at least determine a first time corresponding to an end of a window for a data exchange, determine a second time corresponding to an acknowledgement send during the window, calculate link performance based on the first time and the second time, and transmit the link performance to a network configuration entity.

Example 9 includes the computer readable storage medium of example 8, wherein the instructions cause the one or more processors to determine the first time based on a previously obtained global schedule.

Example 10 includes the computer readable storage medium of examples 8-9, wherein the instructions cause the one or more processors to generate a data frame for a listening device, transmit the data frame to the listening device, and obtain the acknowledgement from the listening device, the second time corresponding to when the acknowledgement was obtained from the listening device.

Example 11 includes the computer readable storage medium of examples 8-10, wherein the instructions cause the one or more processors to generate the acknowledgement in response to obtaining a data frame to a talking device, and transmit the acknowledgement to the talking device, the second time corresponding to when the acknowledgement was transmitted.

Example 12 includes the computer readable storage medium of examples 8-11, wherein the instructions cause the one or more processors to flag an error when at least one of the acknowledgement is not received within the window, the acknowledgement is not transmitted within the window, or a data frame is not obtained within the window.

Example 13 includes the computer readable storage medium of examples 8-12, wherein the instructions cause the one or more processors to calculate the link performance based on a difference between the first time and the second time.

Example 14 includes the computer readable storage medium of examples 8-13, wherein the instructions cause the one or more processors to transmit the link performance to the network configuration entity to at least one of mitigate an error or adjust a length of the window to increase performance or efficiency.

Example 15 includes a method comprising determining, by executing an instruction with one or more processors, a first time corresponding to an end of a window for a data exchange, determining, by executing an instruction with the one or more processors, a second time corresponding to an acknowledgement send during the window, calculating, by executing an instruction with the one or more processors, link performance based on the first time and the second time, and transmitting the link performance to a network configuration entity.

Example 16 includes the method of example 15, further including determining the first time based on a previously obtained global schedule.

Example 17 includes the method of examples 15-16, further including generating a data frame for a listening device, transmitting the data frame to the listening device, and obtaining the acknowledgement from the listening device, the second time corresponding to when the acknowledgement was obtained from the listening device.

Example 18 includes the method of examples 15-17, further including generating the acknowledgement in response to obtaining a data frame to a talking device, and transmitting the acknowledgement to the talking device, the second time corresponding to when the acknowledgement was transmitted.

Example 19 includes the method of examples 15-18, further including flagging an error when at least one of the acknowledgement is not received within the window, the acknowledgement is not transmitted within the window, or a data frame is not obtained within the window.

Example 20 includes the method of examples 15-19, further including calculating the link performance based on a difference between the first time and the second time.

Example 21 includes the method of examples 15-20, wherein the transmitting of the link performance to the network configuration entity is to at least one of mitigate an error or adjust a length of the window to increase performance or efficiency.

Example 22 includes an apparatus comprising means for determining a first time corresponding to an end of a window for a data exchange, means for determining a second time corresponding to an acknowledgement send during the window, means for calculating a link performance based on the first time and the second time, and means for transmitting the link performance to a network configuration entity.

Example 23 includes the apparatus of example 22, wherein the means for determining the first time is to determine the first time based on a previously obtained global schedule.

Example 24 includes the apparatus of examples 22-23, wherein the means for determining the first time is to generate a data frame for a listening device, and wherein the means for transmitting is to transmit the data frame to the listening device, and obtain the acknowledgement from the listening device, the second time corresponding to when the acknowledgement was obtained from the listening device.

Example 25 includes the apparatus of examples 22-24, wherein the means for determining the first time is to generate the acknowledgement in response to obtaining a data frame to a talking device, and the means for transmitting is to transmit the acknowledgement to the talking device, the second time corresponding to when the acknowledgement was transmitted.

Example 26 includes the apparatus of examples 22-25, further including means for flagging an error when at least one of the acknowledgement is not received within the window, the acknowledgement is not transmitted within the window, or a data frame is not obtained within the window.

Example 27 includes the apparatus of examples 22-26, wherein the means for calculating is to calculate the link performance based on a difference between the first time and the second time.

Example 28 includes the apparatus of examples 22-27, wherein the means for transmitting is to transmit the link performance to the network configuration entity to at least one of mitigate an error or adjust a length of the window to increase performance or efficiency.

Example 29 includes a system comprising a data extractor to determine a quality of service guarantee corresponding to a topic from an application of a publishing device, a map generator to map a time sensitive network data writer to a data writer of the publishing device, a negotiator to, when a subscribing device subscribes to the topic, negotiate a time sensitive network data stream between the time sensitive network data writer and a time sensitive network data reader, the time sensitive network data stream adhering to the quality of service guarantee, the time sensitive network data writer to transmit the topic from the data writer of the publishing device to the time sensitive network data reader via the time sensitive network data stream, and the time sensitive network data reader to transmit the topic to a data reader of the subscribing device.

Example 30 includes the system of example 29, wherein the data extractor is to determine the quality of service guarantee by extracting a time sensitive network profile from a quality of service policy, the time sensitive network profile including the quality of service guarantee.

Example 31 includes the system of examples 29-30, further including an interface to obtain the quality of service guarantee from the publishing device.

Example 32 includes the system of examples 29-31, further including an interface to transmit the map to the publishing device to cause the publishing device to transmit the topic to the time sensitive network data writer.

Example 33 includes the system of examples 29-32, wherein the negotiator is to negotiate the time sensitive network data stream in response to obtaining a request to subscribe to the topic from the subscribing device.

Example 34 includes the system of examples 29-33, further including storage to store the quality of service guarantee, the negotiator to access the storage when negotiating the time sensitive network data stream.

Example 35 includes the system of examples 29-34, wherein the negotiator is to negotiate the time sensitive network data stream by interfacing with at least one of a user configuration entity or a central network configuration entity.

Example 36 includes the system of examples 29-35, wherein the system is implemented in a time sensitive network configuration service domain and the data reader and the data writer are implemented in a data distribute service domain.

Example 37 includes a computer readable storage medium comprising instructions which, when executed, cause one or more processors to at least determine a quality of service guarantee corresponding to a topic from an application of a publishing device, map a time sensitive network data writer to a data writer of the publishing device, when a subscribing device subscribes to the topic, negotiate a time sensitive network data stream between the time sensitive network data writer and a time sensitive network data reader, the time sensitive network data stream adhering to the quality of service guarantee, transmit the topic from the data writer of the publishing device to the time sensitive network data reader via the time sensitive network data stream, and transmit the topic to a data reader of the subscribing device.

Example 38 includes the computer readable storage medium of example 37, wherein the instructions cause the one or more processors to determine the quality of service guarantee by extracting a time sensitive network profile from a quality of service policy, the time sensitive network profile including the quality of service guarantee.

Example 39 includes the computer readable storage medium of examples 37-38, wherein the instructions cause the one or more processors to obtain the quality of service guarantee from the publishing device.

Example 40 includes the computer readable storage medium of examples 37-39, wherein the instructions cause the one or more processors to transmit the map to the publishing device to cause the publishing device to transmit the topic to the time sensitive network data writer.

Example 41 includes the computer readable storage medium of examples 37-40, wherein the instructions cause the one or more processors to negotiate the time sensitive network data stream in response to obtaining a request to subscribe to the topic from the subscribing device.

Example 42 includes the computer readable storage medium of examples 37-41, wherein the instructions cause the one or more processors to store the quality of service guarantee, the instructions to cause the one or more processors to access storage when negotiating the time sensitive network data stream.

Example 43 includes the computer readable storage medium of examples 37-42, wherein the instructions cause the one or more processors to negotiate the time sensitive network data stream by interfacing with at least one of a user configuration entity or a central network configuration entity.

Example 44 includes the computer readable storage medium of examples 37-43, wherein the one or more processors is implemented in a time sensitive network configuration service domain and the data reader and the data writer are implemented in a data distribute service domain.

Example 45 includes a method comprising determining, by executing an instruction with one or more processors, a quality of service guarantee corresponding to a topic from an application of a publishing device, mapping, by executing an instruction with the one or more processors, a time sensitive network data writer to a data writer of the publishing device, when a subscribing device subscribes to the topic, negotiating, by executing an instruction with the one or more processors, a time sensitive network data stream between the time sensitive network data writer and a time sensitive network data reader, the time sensitive network data stream adhering to the quality of service guarantee, transmitting the topic from the data writer of the publishing device to the time sensitive network data reader via the time sensitive network data stream, and transmitting the topic to a data reader of the subscribing device.

Example 46 includes the method of example 45, wherein the determining of the quality of service guarantee includes extracting a time sensitive network profile from a quality of service policy, the time sensitive network profile including the quality of service guarantee.

Example 47 includes the method of examples 45-46, further including obtaining the quality of service guarantee from the publishing device.

Example 48 includes the method of examples 45-47, further including transmitting the mapping to the publishing device to cause the publishing device to transmit the topic to the time sensitive network data writer.

Example 49 includes the method of examples 45-48, further including negotiating the time sensitive network data stream in response to obtaining a request to subscribe to the topic from the subscribing device.

Example 50 includes the method of examples 45-49, further including storage to store the quality of service guarantee, the means for negotiating to access the storage when negotiating the time sensitive network data stream.

Example 51 includes the method of examples 45-50, wherein the negotiating of the time sensitive network data stream includes interfacing with at least one of a user configuration entity or a central network configuration entity.

Example 52 includes the method of examples 45-51, wherein the one or more processors is implemented in a time sensitive network configuration service domain and the data reader and the data writer are implemented in a data distribute service domain.

Example 53 includes a system comprising means for determining a quality of service guarantee corresponding to a topic from an application of a publishing device, means for mapping a time sensitive network data writer to a data writer of the publishing device, means for, when a subscribing device subscribes to the topic, negotiating a time sensitive network data stream between the means for negotiating and a time sensitive network data reader, the time sensitive network data stream adhering to the quality of service guarantee, means for transmitting transmit the topic from the data writer of the publishing device to a second means for transmitting via the time sensitive network data stream, and the second means for transmitting to transmit the topic to a data reader of the subscribing device.

Example 54 includes the system of example 53, wherein the means for determining is to determine the quality of service guarantee by extracting a time sensitive network profile from a quality of service policy, the time sensitive network profile including the quality of service guarantee.

Example 55 includes the system of examples 53-54, further including means for obtaining the quality of service guarantee from the publishing device.

Example 56 includes the system of examples 53-55, further including third means for transmitting the mapping to the publishing device to cause the publishing device to transmit the topic to means for transmitting.

Example 57 includes the system of examples 53-56, wherein the means for negotiating is to negotiate the time sensitive network data stream in response to obtaining a request to subscribe to the topic from the subscribing device.

Example 58 includes the system of examples 53-57, further including means for storing the quality of service guarantee, the means for negotiating to access means for storing when negotiating the time sensitive network data stream.

Example 59 includes the system of examples 53-58, wherein the means for negotiating is to negotiate the time sensitive network data stream by interfacing with at least one of a user configuration entity or a central network configuration entity.

Example 60 includes the system of examples 53-59, wherein the system is implemented in a time sensitive network configuration service domain and the data reader and the data writer are implemented in a data distribute service domain.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry to transmit a link performance to a network configuration entity;
   computer readable instructions; and
   at least one processor circuit to be programmed by the computer readable instructions to at least:
   calculate the link performance between a first device and a second device in a network based on (a) a first time corresponding to an end of a window for a data exchange as defined in a global schedule for devices operating in the network and (b) a second time corresponding to an acknowledgement sent during the window.

2. The apparatus of claim 1, wherein the at least one processor circuit is to determine the first time based on a previously obtained global schedule.

3. The apparatus of claim 1, wherein:
   the at least one processor circuit is to generate a data frame for a listening device; and
   the interface circuitry is to:
   transmit the data frame to the listening device; and
   obtain the acknowledgement from the listening device, the second time corresponding to when the acknowledgement was obtained from the listening device.

4. The apparatus of claim 1, wherein:
   the at least one processor circuit is to generate the acknowledgement based on a data frame from a talking device; and the interface circuitry is to transmit the acknowledgement to the talking device, the second time corresponding to when the acknowledgement was transmitted.

5. The apparatus of claim 1, wherein the at least one processor circuit to flag an error when at least one of the acknowledgement is not received within the window, the acknowledgement is not transmitted within the window, or a data frame is not obtained within the window.

6. The apparatus of claim 1, wherein the at least one processor circuit is to calculate the link performance based on a difference between the first time and the second time.

7. The apparatus of claim 1, wherein the interface circuitry is to transmit the link performance to the network configuration entity to at least one of mitigate an error or adjust a length of the window to increase performance or efficiency.

8. A computer readable storage medium comprising instructions to cause at least one processor circuit to at least:
calculate link performance between a first device and a second device based on (a) a first time corresponding to an end of a window for a data exchange and (b) a second time corresponding to an acknowledgement sent during the window; and
cause adjustment of a global schedule by causing transmission of the link performance to a network configuration entity.

9. The computer readable storage medium of claim 8, wherein the instructions cause the at least one processor circuit to:
generate a data frame for a listening device;
transmit the data frame to the listening device; and
obtain the acknowledgement from the listening device, the second time corresponding to when the acknowledgement was obtained from the listening device.

10. The computer readable storage medium of claim 8, wherein the instructions cause the at least one processor circuit to:
generate the acknowledgement based on a data frame from a talking device; and
transmit the acknowledgement to the talking device, the second time corresponding to when the acknowledgement was transmitted.

11. The computer readable storage medium of claim 8, wherein the instructions cause the at least one processor circuit to flag an error when at least one of the acknowledgement is not received within the window, the acknowledgement is not transmitted within the window, or a data frame is not obtained within the window.

12. The computer readable storage medium of claim 8, wherein the instructions cause the at least one processor circuit to calculate the link performance based on a difference between the first time and the second time.

13. The computer readable storage medium of claim 8, wherein the instructions cause the at least one processor circuit to transmit the link performance to the network configuration entity to at least one of mitigate an error or adjust a length of the window to increase performance or efficiency.

14. A method comprising:
calculating, by executing an instruction with at least one processor circuit, link performance based on (a) a first time corresponding to an end of a window for a data exchange and (b) a second time corresponding to an acknowledgement sent during the window; and
causing adjustment of a duration of the window for future data exchange by transmitting the link performance to a network configuration entity.

15. The method of claim 14, further including determining the first time based on a previously obtained global schedule.

16. The method of claim 14, further including:
generating a data frame for a listening device;
transmitting the data frame to the listening device; and
obtaining the acknowledgement from the listening device, the second time corresponding to when the acknowledgement was obtained from the listening device.

17. The method of claim 14, further including:
generating the acknowledgement based on a data frame from a talking device; and
transmitting the acknowledgement to the talking device, the second time corresponding to when the acknowledgement was transmitted.

18. The method of claim 14, further including flagging an error when at least one of the acknowledgement is not received within the window, the acknowledgement is not transmitted within the window, or a data frame is not obtained within the window.

19. The method of claim 14, further including calculating the link performance based on a difference between the first time and the second time.

20. The method of claim 14, wherein the transmitting of the link performance to the network configuration entity is to at least one of mitigate an error or adjust a length of the window to increase performance or efficiency.

21. An apparatus comprising:
means for calculating a link performance based on (a) a first time corresponding to an end of a window for a data exchange and (b) a second time corresponding to an acknowledgement sent during the window; and
means for transmitting the link performance to a network configuration entity.

22. The apparatus of claim 21, further including means for determining the first time is to determine the first time based on a previously obtained global schedule.

23. The apparatus of claim 21, further including means for determining the first time is to generate a data frame for a listening device, wherein the means for transmitting is to:
transmit the data frame to the listening device; and
obtain the acknowledgement from the listening device, the second time corresponding to when the acknowledgement was obtained from the listening device.

24. The apparatus of claim 1, wherein the at least one processor circuit is to:
determine a quality of service guarantee corresponding to a topic from an application of a publishing device;
map a time sensitive network data writer to a data writer of the publishing device;
when a subscribing device subscribes to the topic, negotiate a time sensitive network data stream between the time sensitive network data writer and a time sensitive network data reader, the time sensitive network data stream adhering to the quality of service guarantee;
transmit the topic from the data writer of the publishing device to the time sensitive network data reader via the time sensitive network data stream; and
transmit the topic to a data reader of the subscribing device.

25. The apparatus of claim 1, wherein the interface circuitry is to transmit the link performance to the network configuration entity to adjust the global schedule for the first device and the second device.

* * * * *

UNITED STATES PATENT AND TRADEMARK OFFICE
CERTIFICATE OF CORRECTION

| | |
|---|---|
| PATENT NO. | : 12,166,682 B2 |
| APPLICATION NO. | : 17/132845 |
| DATED | : December 10, 2024 |
| INVENTOR(S) | : Galeev et al. |

Page 1 of 1

It is certified that error appears in the above-identified patent and that said Letters Patent is hereby corrected as shown below:

On the Title Page

Item (73) Under Assignee, Delete "Intel Corporation" and Insert --Intel Corporation, Santa Clara, CA (US)--.

Signed and Sealed this
Eleventh Day of February, 2025

Coke Morgan Stewart
*Acting Director of the United States Patent and Trademark Office*